United States Patent
Hsueh et al.

(10) Patent No.: US 12,455,638 B1
(45) Date of Patent: Oct. 28, 2025

(54) ROLLER MODULE

(71) Applicant: Primax Electronics Ltd., Taipei (TW)

(72) Inventors: Tsung-Wen Hsueh, Taipei (TW); Chun-Che Wu, Taipei (TW); Chien-Pang Chien, Taipei (TW); Sheng-An Tsai, Taipei (TW); Kai-Wen Lee, Taipei (TW); Li-Kuei Cheng, Taipei (TW); Heng-Tseng Liao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/908,168

(22) Filed: Oct. 7, 2024

(30) Foreign Application Priority Data

Aug. 15, 2024 (TW) .................................. 113130626

(51) Int. Cl.
*G06F 3/0354* (2013.01)
*G06F 3/0362* (2013.01)
*H02K 49/04* (2006.01)

(52) U.S. Cl.
CPC ........ *G06F 3/03543* (2013.01); *G06F 3/0362* (2013.01); *H02K 49/046* (2013.01)

(58) Field of Classification Search
CPC .. G06F 3/03543; G06F 3/0362; H02K 49/046
See application file for complete search history.

(56) References Cited

U.S. PATENT DOCUMENTS

| | | | |
|---|---|---|---|
| 11,061,493 B1 * | 7/2021 | Cheng .................. | G06F 3/0383 |
| 11,175,752 B1 * | 11/2021 | Chu ...................... | G06F 3/0362 |
| 11,681,379 B1 * | 6/2023 | Su .......................... | G06F 3/016 |
| | | | 345/163 |
| 11,797,108 B1 * | 10/2023 | Su ....................... | G06F 3/03543 |
| 11,989,361 B1 * | 5/2024 | Vlasov ................ | G06F 3/03543 |
| 12,039,114 B1 * | 7/2024 | Su .......................... | G06F 3/0362 |
| 2007/0188453 A1 * | 8/2007 | O'Sullivan .......... | G06F 3/03543 |
| | | | 345/163 |
| 2018/0210562 A1 * | 7/2018 | Kao ...................... | G06F 3/0362 |
| 2019/0121452 A1 * | 4/2019 | Hsueh .................. | G06F 3/03543 |
| 2020/0004352 A1 * | 1/2020 | McLoughlin ....... | G06F 3/03543 |
| 2020/0183503 A1 * | 6/2020 | Shih ..................... | G01R 33/072 |
| 2023/0341956 A1 * | 10/2023 | Rizvi .................... | G06F 3/0362 |

* cited by examiner

*Primary Examiner* — Ariel A Balaoing
(74) *Attorney, Agent, or Firm* — KIRTON McCONKIE; Evan R. Witt

(57) ABSTRACT

A roller module includes a wheel disc, a magnetic conductor and an electro-permanent magnet assembly. The wheel disc is rotatable along a rotation axis line. The magnetic conductor is coaxially arranged and synchronously rotated with the wheel disc. The magnetic conductor includes a hub and plural spokes. The plural spokes are radially extended from the hub. The magnetic conductor is arranged between the wheel disc and the electro-permanent magnet assembly. When the electro-permanent magnet assembly is operated in the first operating status, the electro-permanent magnet assembly provides a first magnetic attraction force to at least one spoke in the axial direction. When the electro-permanent magnet assembly is operated in the second operating status, the electro-permanent magnet assembly provides a second magnetic attraction force to at least one spoke in the axial direction. The first magnetic attraction force is greater than the second magnetic attraction force.

56 Claims, 20 Drawing Sheets

ROLLER MODULE

FIELD OF THE INVENTION

The present invention relates to a roller module, and more particularly to a roller module capable of being operated in a stepped rotation mode or a non-stepped rotation mode and also a human-machine interface device with the roller module.

BACKGROUND OF THE INVENTION

Nowadays, a human-machine interface device such as a mouse is equipped with a roller module. The roller module can be operated in a stepped rotation mode or a non-stepped rotation mode. In order to achieve the function of selectively rotating the roller module in the stepped rotation mode or the non-stepped rotation mode, the structure of the wheel disc in the roller module needs to be largely changed. Due to this structural design, the rotational equilibrium of the wheel disc itself will be affected, and the durability of the wheel disc will be reduced.

For allowing the roller module to be selectively operated in the stepped rotation mode or the non-stepped rotation mode, the mechanism of the roller module needs to be further improved.

SUMMARY OF THE INVENTION

In order to overcome the drawbacks of the conventional technologies, the present invention provides a roller module. The roller module includes a wheel disc and an electro-permanent magnet assembly. The electro-permanent magnet assembly is arranged along an axial direction. When the wheel disc is in a stepped rotation mode, the electro-permanent magnet assembly provides an axial rotation resistance force to the wheel disc in the axial direction. When a reverse current flows through the coil, the wheel disc is not influenced by the electro-permanent magnet assembly. Consequently, the wheel disc can be rotated in a non-stepped rotation mode. The wheel disc can be pivotally coupled to a supporting base. Consequently, the stability and the durability of the wheel disc upon rotation can be maintained.

In accordance with an aspect of the present invention, a roller module is provided. The roller module includes a wheel disc, a magnetic conductor and an electro-permanent magnet assembly. The wheel disc is rotatable along a rotation axis line. The magnetic conductor is coaxially arranged and synchronously rotated with the wheel disc. The magnetic conductor includes a hub and plural spokes. The plural spokes are radially extended from the hub. In addition, the plural spokes are in a radial arrangement. The electro-permanent magnet assembly is located beside the magnetic conductor. The magnetic conductor is arranged between the wheel disc and the electro-permanent magnet assembly along an axial direction parallel with the rotation axis line. The electro-permanent magnet assembly is selectively operated in a first operating status or a second operating status. When the electro-permanent magnet assembly is operated in the first operating status, the electro-permanent magnet assembly provides a first magnetic attraction force to at least one spoke of the plural spokes in the axial direction. When the electro-permanent magnet assembly is operated in the second operating status, the electro-permanent magnet assembly provides a second magnetic attraction force to at least one spoke of the plural spokes in the axial direction. The first magnetic attraction force is greater than the second magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first protrusion part. The first connecting part is connected with the first magnetic pole terminal and the third magnetic pole terminal. The first protrusion part is axially protruded from the first connecting part and protruded toward the magnetic conductor. The first protrusion part is located near at least one spoke of the plural spokes.

In an embodiment, the first protrusion part includes plural first claws, and each of the plural first claws is located near the corresponding spoke of the plural spokes.

In an embodiment, the plural first claws are in the radial arrangement with the rotation axis line as the center.

In an embodiment, the second magnetic conduction block includes a second connecting part and a second protrusion part. The second connecting part is connected with the second magnetic pole terminal and the sixth magnetic pole terminal. The second protrusion part is axially protruded from the second connecting part and protruded toward the magnetic conductor. The second protrusion part is located near at least one spoke of the plural spokes.

In an embodiment, the second protrusion part includes plural second claws, and each of the plural second claws is located near the corresponding spoke of the plural spokes.

In an embodiment, the plural second claws are in the radial arrangement with the rotation axis line as the center.

In an embodiment, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the wheel disc includes a first lateral disc part, a second lateral disc part, a pivotal part and an outer disc part. The first lateral disc part and the second lateral disc part are opposed to each other. The outer disc part is arranged around the first lateral disc part and the second lateral disc part.

In an embodiment, the roller module further includes a supporting base, and the supporting base includes an accommodation recess, a first pivotal hole and a second pivotal hole. A portion of the wheel disc is received within the accommodation recess. The first pivotal hole and the second pivotal hole are respectively located beside two opposite sides of the accommodation recess.

In an embodiment, the pivotal part of the wheel disc includes a first shaft sleeve, and the roller module further includes a shaft rod. The first shaft sleeve is externally extended from the first lateral disc part of the wheel disc. The shaft rod is penetrated through the first shaft sleeve. The two ends of the shaft rod are respectively inserted into the first pivotal hole and the second pivotal hole of the supporting base. The magnetic conductor is sheathed around the first shaft sleeve or the shaft rod.

In an embodiment, the pivotal part of the wheel disc further includes a second shaft sleeve, the roller module further includes a rotation sensor, and the rotation sensor includes a magnetic turntable and a sensing chip. The second shaft sleeve is externally extended from the second lateral disc part of the wheel disc. The shaft rod is further penetrated through the second shaft sleeve. The magnetic turntable is sheathed around the second shaft sleeve, installed in the second shaft sleeve or sheathed around the shaft rod. The magnetic turntable is synchronously rotated with the magnetic turntable.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole. The magnetic conductor is sheathed around the first rotation shaft.

In an embodiment, the roller module further includes a rotation sensor, and the rotation sensor includes a magnetic turntable and a sensing chip. A rotation state of the wheel disc is detected by the sensing chip. The magnetic turntable is sheathed around the second rotation shaft and synchronously rotated with the wheel disc.

In accordance with another aspect of the present invention, a roller module is provided. The roller module includes a wheel disc, a magnetic conductor and an electro-permanent magnet assembly. The wheel disc is rotatable along a rotation axis line. The magnetic conductor is synchronously rotated with the wheel disc. The magnetic conductor includes a connecting plate and plural extension structures. The plural extension structures are axially extended from the connecting plate. In addition, the plural extension structures are in a radial arrangement with the rotation axis line as a center. The electro-permanent magnet assembly is located beside the magnetic conductor. The magnetic conductor is arranged between the wheel disc and the electro-permanent magnet assembly along an axial direction parallel with the rotation axis line. The electro-permanent magnet assembly is selectively operated in a first operating status or a second operating status. When the electro-permanent magnet assembly is operated in the first operating status, the electro-permanent magnet assembly provides a first magnetic attraction force to at least one extension structure of the plural extension structures in the axial direction. When the electro-permanent magnet assembly is operated in the second operating status, the electro-permanent magnet assembly provides a second magnetic attraction force to at least one extension structure of the plural extension structures in the axial direction. The first magnetic attraction force is greater than the second magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first protrusion part. The first connecting part is connected with the first magnetic pole terminal and the third magnetic pole terminal. The first protrusion part is axially protruded from the first connecting part and protruded toward the magnetic conductor. The first protrusion part is located near at least one extension structure of the plural extension structures.

In an embodiment, the first protrusion part includes plural first claws, and each of the plural first claws is located near the corresponding extension structure of the plural extension structures.

In an embodiment, the plural first claws are in the radial arrangement with the rotation axis line as the center.

In an embodiment, the second magnetic conduction block includes a second connecting part and a second protrusion part. The second connecting part is connected with the second magnetic pole terminal and the sixth magnetic pole terminal. The second protrusion part is axially protruded from the second connecting part and protruded toward the magnetic conductor. The second protrusion part is located near at least one extension structure of the plural extension structures.

In an embodiment, the second protrusion part includes plural second claws, and each of the plural second claws is located near the corresponding spoke of the plural spokes.

In an embodiment, the plural second claws are in the radial arrangement with the rotation axis line as the center.

In an embodiment, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the wheel disc includes a first lateral disc part, a second lateral disc part, a pivotal part, an outer disc part and an accommodation structure. The first lateral disc part and the second lateral disc part are opposed to each other. The outer disc part is arranged around the first lateral disc part and the second lateral disc part. The accommodation structure is concavely formed in the first lateral disc part and extended toward the second lateral disc part. The magnetic conductor is accommodated within the accommodation structure.

In an embodiment, the roller module further includes a supporting base, and the supporting base includes an accommodation recess, a first pivotal hole and a second pivotal hole. A portion of the wheel disc is received within the accommodation recess. The first pivotal hole and the second pivotal hole are respectively located beside two opposite sides of the accommodation recess.

In an embodiment, the pivotal part of the wheel disc includes a first shaft sleeve, and the roller module further includes a shaft rod. The first shaft sleeve is externally extended from the first lateral disc part of the wheel disc. The shaft rod is penetrated through the first shaft sleeve. The two ends of the shaft rod are respectively inserted into the first pivotal hole and the second pivotal hole of the supporting base. The magnetic conductor is sheathed around the first shaft sleeve, sheathed around the shaft rod or fixed in the accommodation structure.

In an embodiment, the pivotal part of the wheel disc further includes a second shaft sleeve, the roller module further includes a rotation sensor, and the rotation sensor includes a magnetic turntable and a sensing chip. The second shaft sleeve is externally extended from the second lateral disc part of the wheel disc. The shaft rod is further penetrated through the second shaft sleeve. The magnetic turntable is sheathed around the second shaft sleeve, installed in the second shaft sleeve or sheathed around the shaft rod. The magnetic turntable is synchronously rotated with the wheel disc.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole. The magnetic conductor is sheathed around the first rotation shaft or fixed in the accommodation structure.

In an embodiment, the roller module further includes a rotation sensor, and the rotation sensor includes a magnetic turntable and a sensing chip. A rotation state of the wheel disc is detected by the sensing chip. The magnetic turntable is sheathed around the second rotation shaft and synchronously rotated with the magnetic turntable.

In accordance with another aspect of the present invention, a roller module is provided. The roller module includes a wheel disc and an electro-permanent magnet assembly. The wheel disc has magnetic conductivity and is rotatable along a rotation axis line. The wheel disc includes a first lateral disc part, a second lateral disc part, a pivotal part, an outer disc part and plural extension structures. The first lateral disc part and the second lateral disc part are opposed to each other. The outer disc part is arranged around the first lateral disc part and the second lateral disc part. The plural extension structures are axially extended from the first lateral disc part or radially extended from the outer disc part. The plural extension structures are in a radial arrangement with the rotation axis line as a center. The electro-permanent magnet assembly is located beside the magnetic conductor. The electro-permanent magnet assembly is selectively operated in a first operating status or a second operating status. When the electro-permanent magnet assembly is operated in the first operating status, the electro-permanent magnet assembly provides a first magnetic attraction force to at least one extension structure of the plural extension structures in an axial direction parallel with the rotation axis line. When the electro-permanent magnet assembly is operated in the second operating status, the electro-permanent magnet assembly provides a second magnetic attraction force to at least one extension structure of the plural extension structures in the axial direction. The first magnetic attraction force is greater than the second magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first protrusion part. The first connecting part is connected with the first magnetic pole terminal and the third magnetic pole terminal. The first protrusion part is axially protruded from the first connecting part and protruded toward the wheel disc. The first protrusion part is located near at least one extension structure of the plural extension structures.

In an embodiment, the first protrusion part includes plural first claws, and each of the plural first claws is located near the corresponding extension structure of the plural extension structures.

In an embodiment, the plural first claws are in the radial arrangement with the rotation axis line as the center.

In an embodiment, the second magnetic conduction block includes a second connecting part and a second protrusion part. The second connecting part is connected with the second magnetic pole terminal and the sixth magnetic pole terminal. The second protrusion part is axially protruded from the second connecting part and protruded toward the wheel disc. The second protrusion part is located near at least one extension structure of the plural extension structures.

In an embodiment, the second protrusion part includes plural second claws, and each of the plural second claws is located near the corresponding extension structure of the plural extension structures.

In an embodiment, the plural second claws are in the radial arrangement with the rotation axis line as the center.

In an embodiment, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the roller module further includes a supporting base, and the supporting base includes an accommodation recess, a first pivotal hole and a second pivotal hole. A portion of the wheel disc is received within the accommodation recess. The first pivotal hole and the second pivotal hole are respectively located beside two opposite sides of the accommodation recess.

In an embodiment, the pivotal part of the wheel disc includes a first shaft sleeve, and the roller module further includes a shaft rod. The first shaft sleeve is externally extended from the first lateral disc part of the wheel disc. The shaft rod is penetrated through the first shaft sleeve. The two ends of the shaft rod are respectively inserted into the first pivotal hole and the second pivotal hole of the supporting base.

In an embodiment, the pivotal part of the wheel disc further includes a second shaft sleeve, the roller module further includes a rotation sensor, and the rotation sensor includes a magnetic turntable and a sensing chip. The second shaft sleeve is externally extended from the second lateral disc part of the wheel disc. The shaft rod is further penetrated through the second shaft sleeve. The magnetic turntable is sheathed around the second shaft sleeve, installed in the second shaft sleeve or sheathed around the shaft rod. The magnetic turntable is synchronously rotated with the wheel disc.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole.

In an embodiment, the roller module further includes a rotation sensor, and the rotation sensor includes a magnetic turntable and a sensing chip. A rotation state of the wheel disc is detected by the sensing chip. The magnetic turntable is sheathed around the second rotation shaft and synchronously rotated with the wheel disc.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
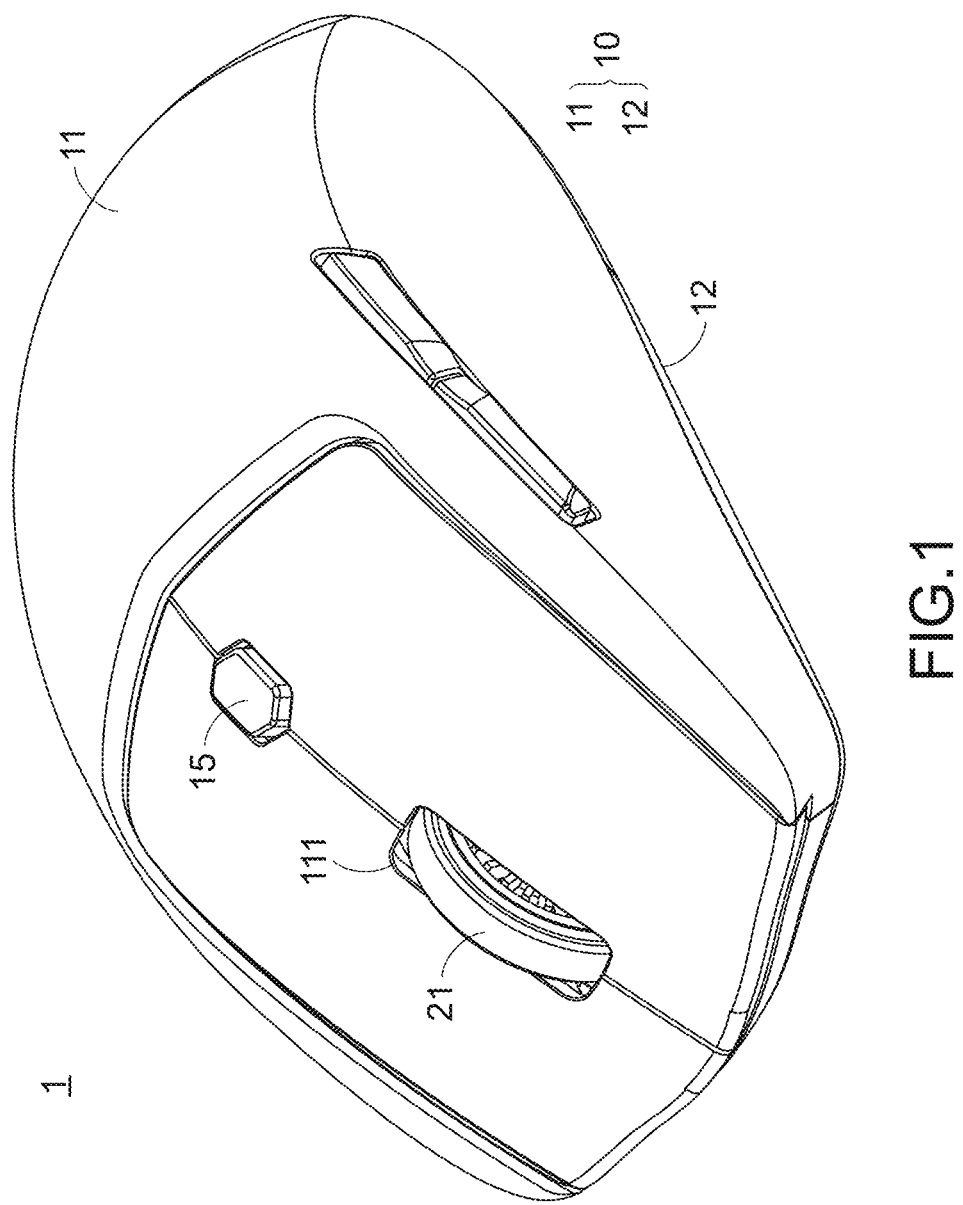
FIG. 1 is a schematic perspective view illustrating a roller module according to a first embodiment of the present invention, wherein the roller module is installed in an inner space of a mouse.
Figure 2:
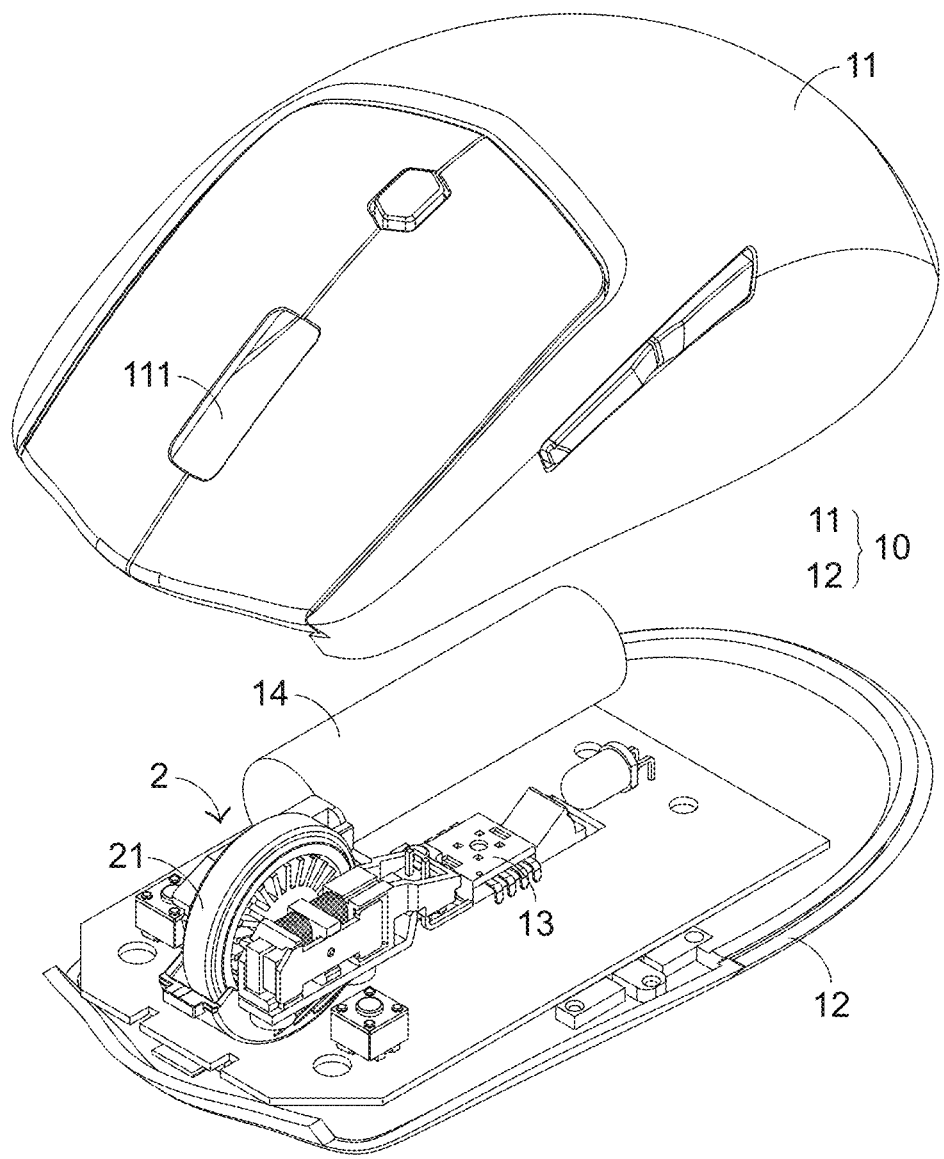
FIG. 2 is a schematic exploded view illustrating the mouse shown in FIG. 1.
Figure 3:
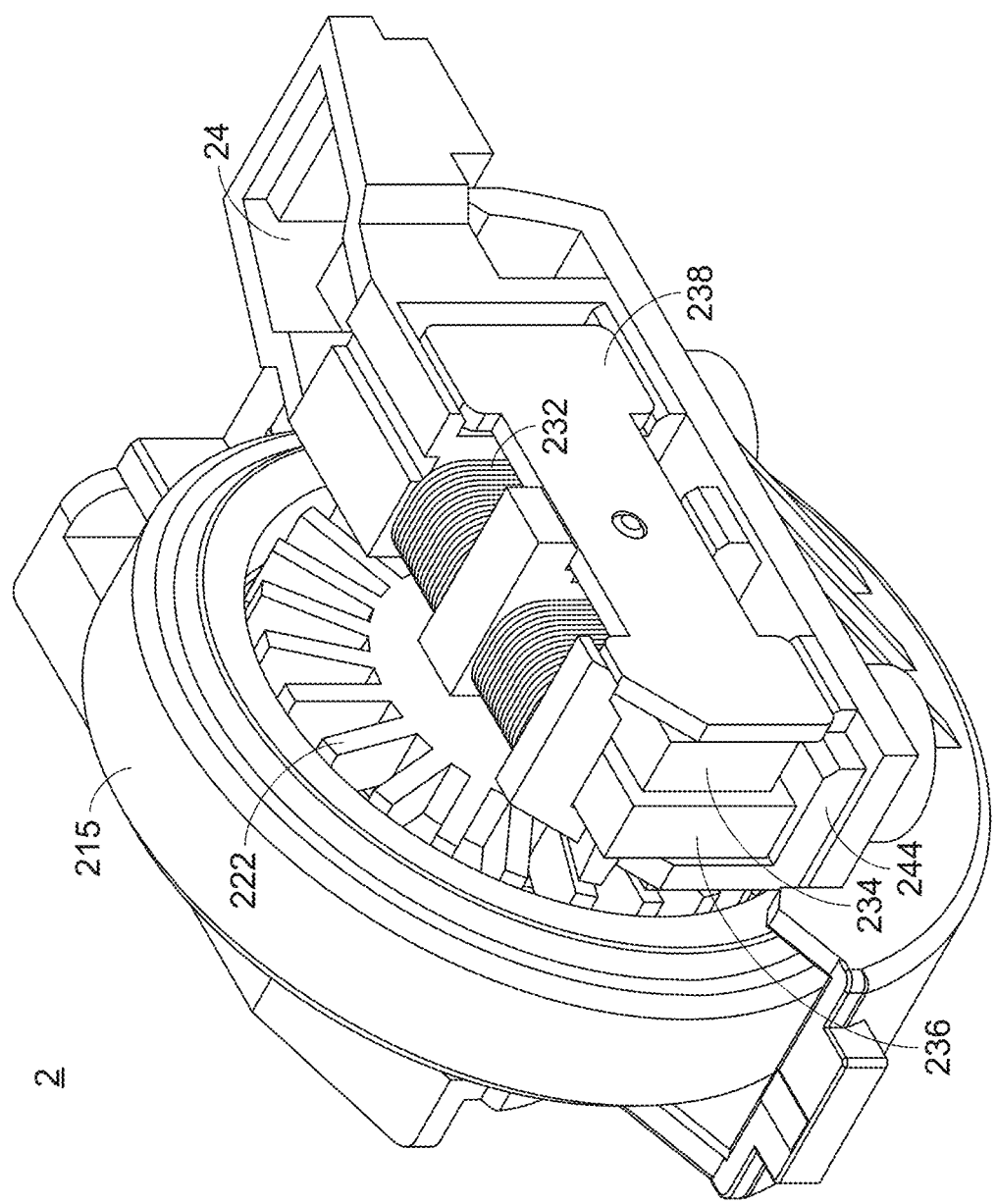
FIG. 3 is a schematic perspective view illustrating the structure of the roller module according to the first embodiment of the present invention.
Figure 4:
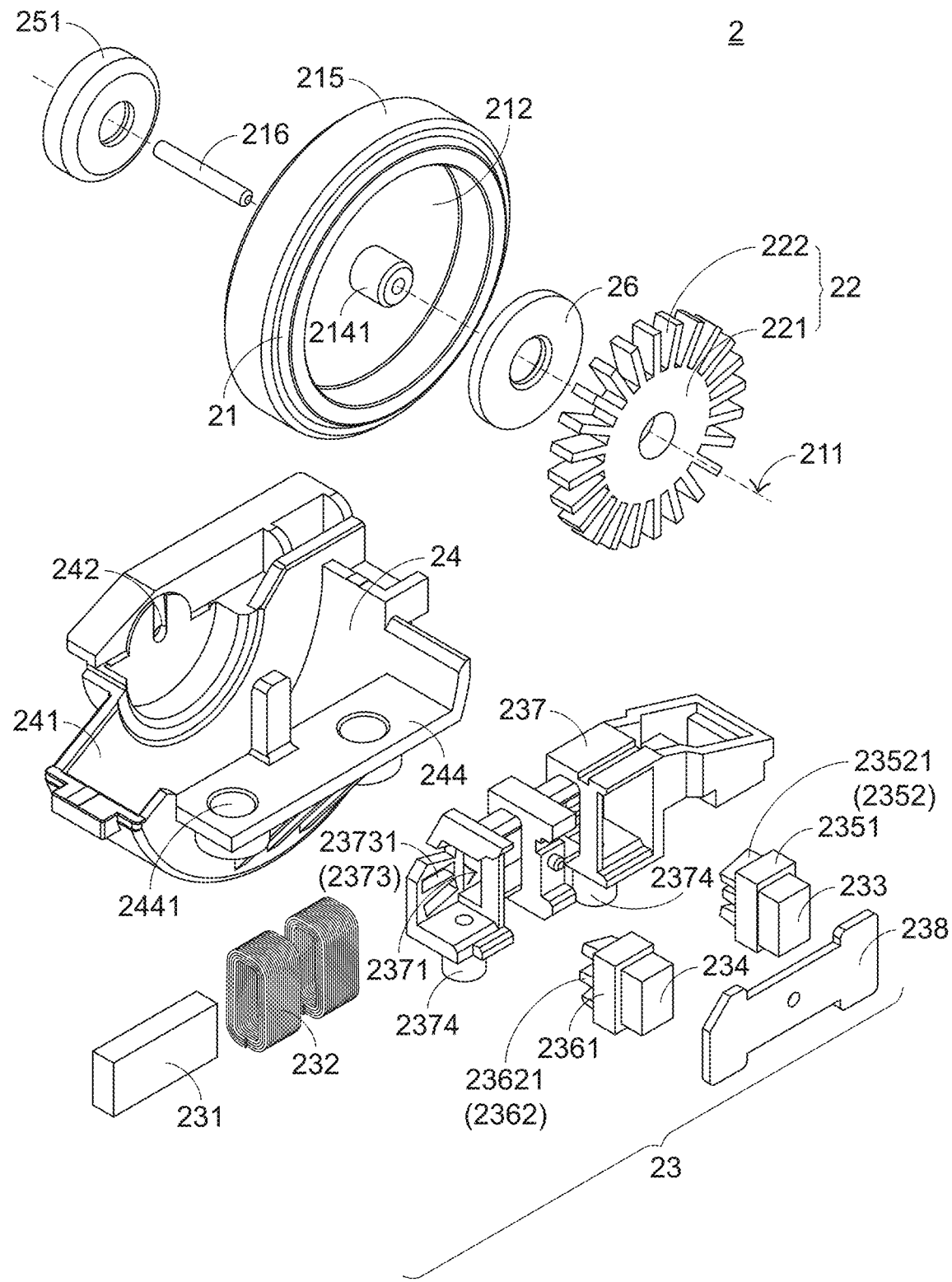
FIG. 4 is a schematic exploded view illustrating the structure of the roller module shown in FIG. 3 and taken along a viewpoint.
Figure 5:
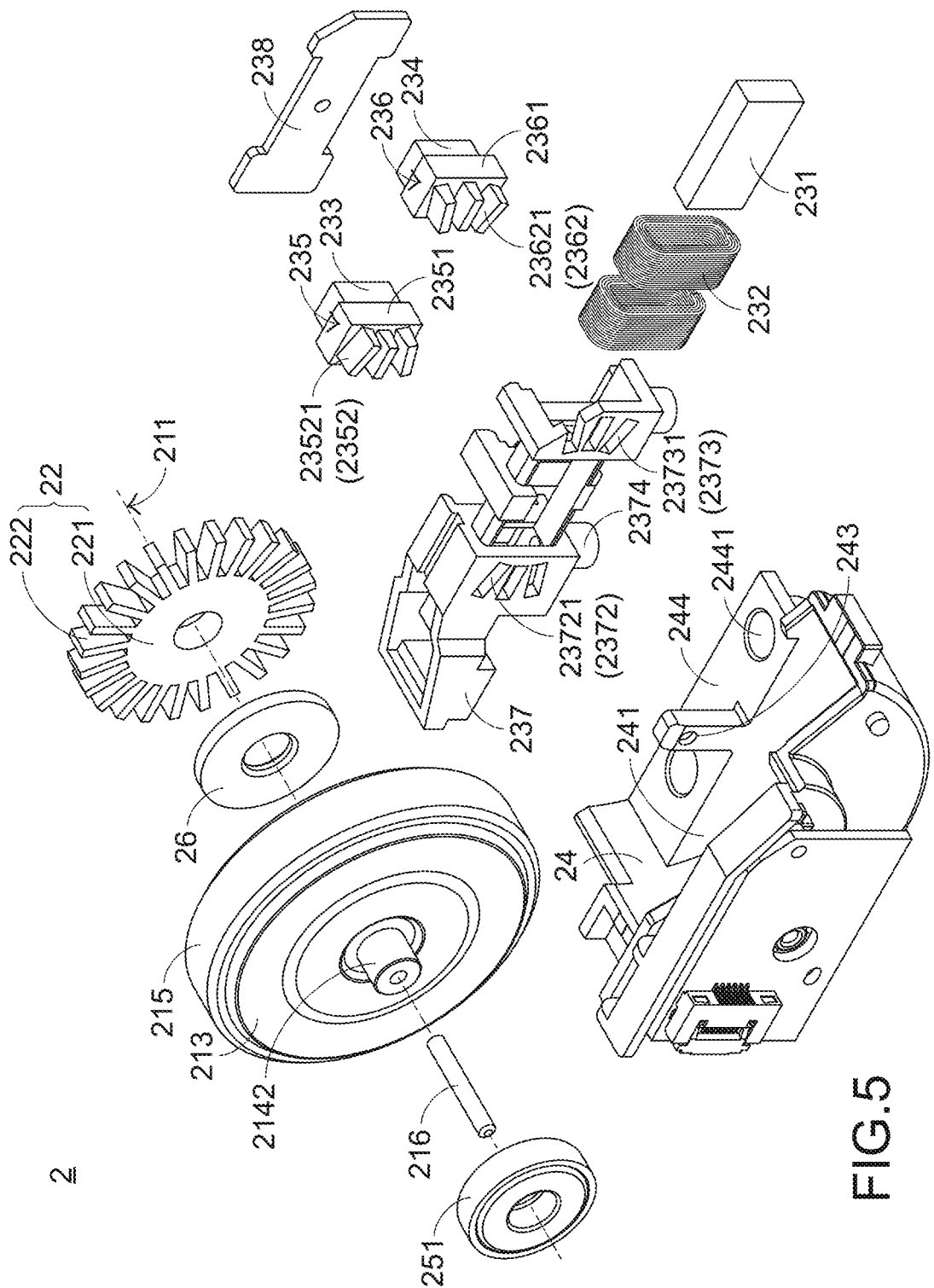
FIG. 5 is a schematic exploded view illustrating the structure of the roller module shown in FIG. 3 and taken along another viewpoint.
Figure 6:
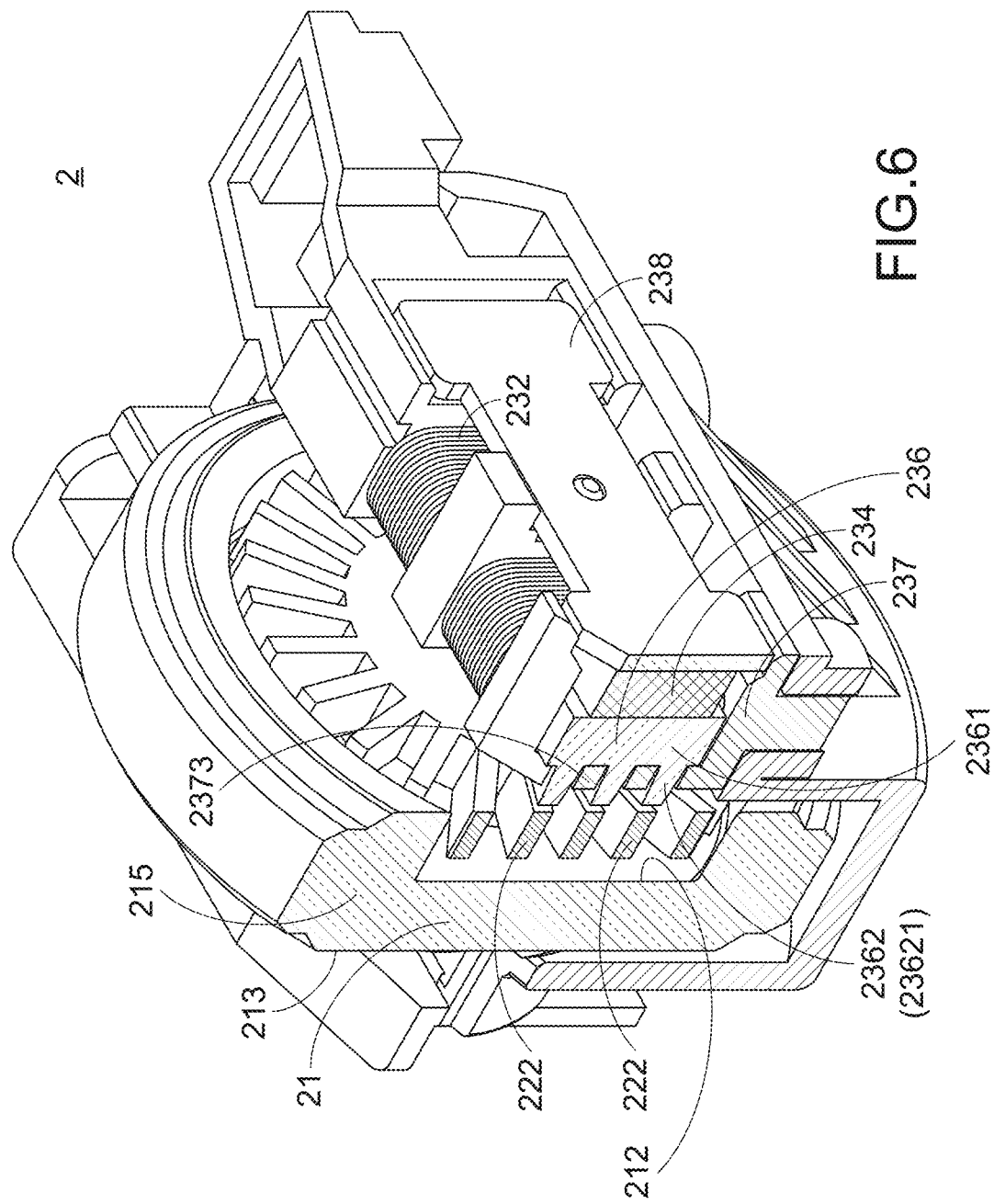
FIG. 6 is a schematic cutaway view illustrating the roller module shown in FIG. 3 and taken along a viewpoint.
Figure 7:
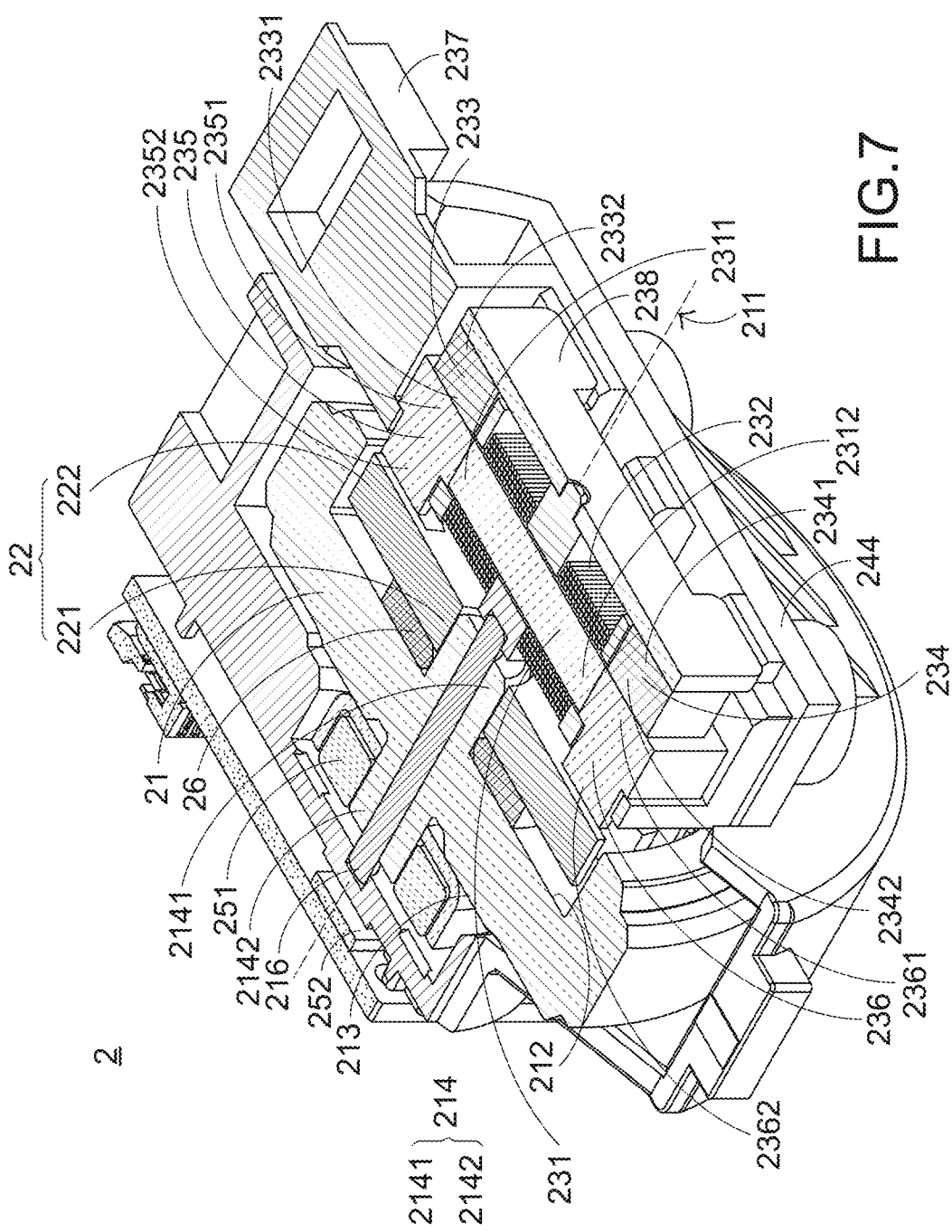
FIG. 7 is a schematic cutaway view illustrating the roller module shown in FIG. 3 and taken along another viewpoint.
Figure 8:
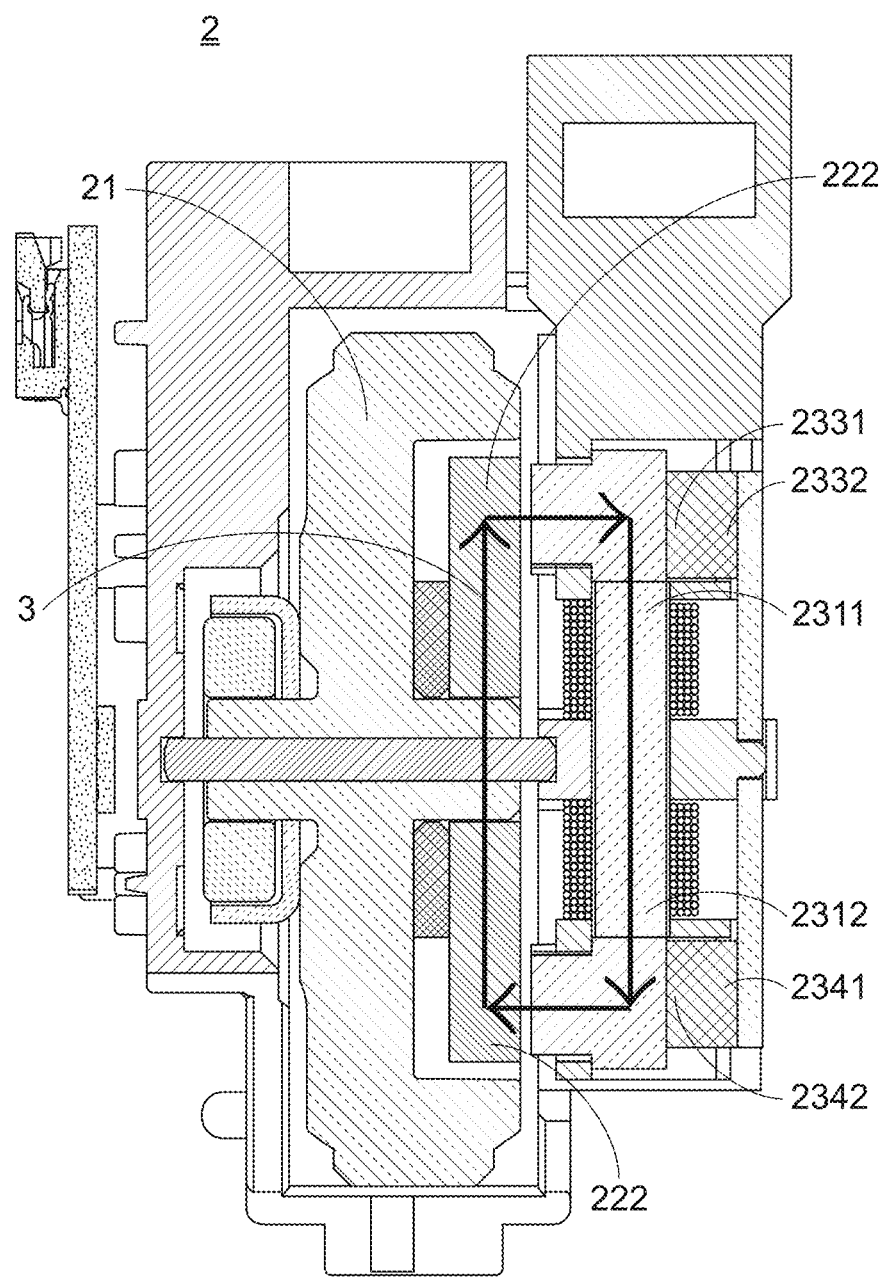
FIG. 8 is a schematic cross-sectional view illustrating the electro-permanent magnet assembly in the roller module shown in FIG. 7 and in a first operating status.
Figure 9:
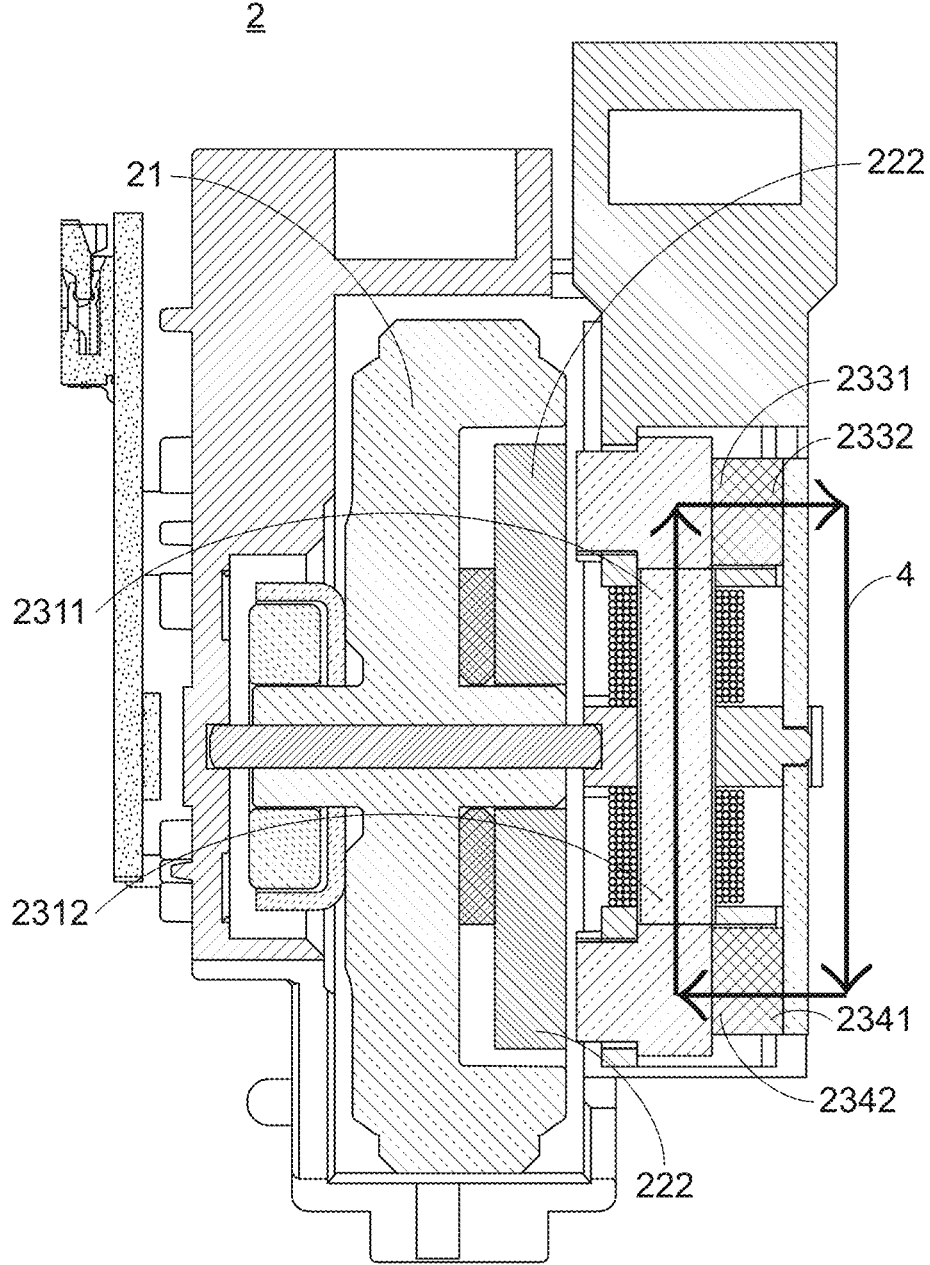
FIG. 9 is a schematic cross-sectional view illustrating the electro-permanent magnet assembly in the roller module shown in FIG. 7 and in a second operating status.
Figure 10:
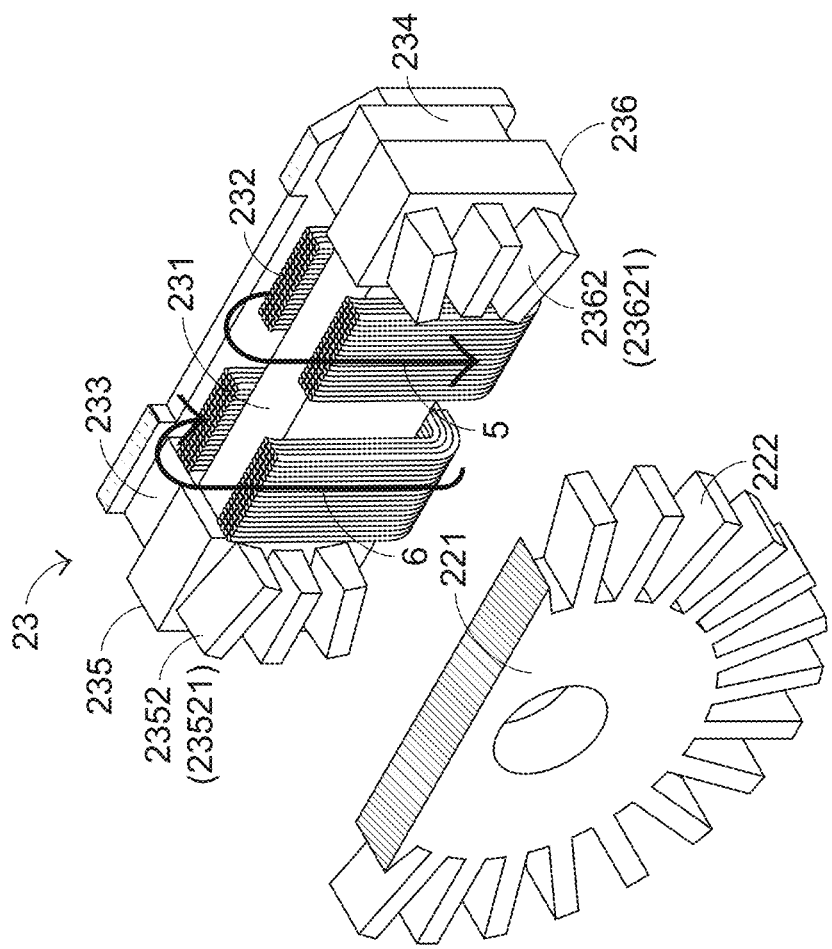
FIG. 10 is a schematic cutaway view illustrating the magnetic conductor and the electro-permanent magnet assembly in the roller module according to the first embodiment of the present invention.

FIG. 1 is a schematic perspective view illustrating a roller module according to a first embodiment of the present invention, wherein the roller module is installed in an inner space of a mouse. FIG. 2 is a schematic exploded view illustrating the mouse shown in FIG. 1. FIG. 3 is a schematic perspective view illustrating the structure of the roller module according to the first embodiment of the present invention. FIG. 4 is a schematic exploded view illustrating the structure of the roller module shown in FIG. 3 and taken along a viewpoint. FIG. 5 is a schematic exploded view illustrating the structure of the roller module shown in FIG. 3 and taken along another viewpoint. FIG. 6 is a schematic cutaway view illustrating the roller module shown in FIG. 3 and taken along a viewpoint. FIG. 7 is a schematic cutaway view illustrating the roller module shown in FIG. 3 and taken along another viewpoint. FIG. 8 is a schematic cross-sectional view illustrating the electro-permanent magnet assembly in the roller module shown in FIG. 7 and in a first operating status. FIG. 9 is a schematic cross-sectional view illustrating the electro-permanent magnet assembly in the roller module shown in FIG. 7 and in a second operating status. FIG. 10 is a schematic cutaway view illustrating the magnetic conductor and the electro-permanent magnet assembly in the roller module according to the first embodiment of the present invention.

The present invention provides a roller module. An example of a roller module according to a first embodiment of the present invention will be described with reference to FIGS. 1 to 10. The roller module can be installed in a human-machine interface device. For example, the human-machine interface device is an input device (e.g., a mouse or a keyboard) or a control device (e.g., a live streaming controller or a live production switcher). In this embodiment, the roller module is installed in an inner space of a mouse. It is noted that the application of the roller module is not restricted.

The mouse 1 includes a housing 10. The housing 10 includes an upper cover 11, a lower cover 12, a displacement sensing assembly 13 and a battery 14. The upper cover 11 has an opening 111. A portion of the roller module 2 is exposed outside through the opening 111. For example, a wheel disc of the roller module 2 is exposed outside through the opening 111, and thus the wheel disc can be touched and operated by the user. The displacement sensing assembly 13 includes an X-Y axis displacement sensor, a circuit board and any other appropriate component.

The roller module 2 includes a wheel disc 21, a magnetic conductor 22, an electro-permanent magnet assembly 23, a supporting base 24 and a rotation sensor 25.

The supporting base 24 includes an accommodation recess 241, a first pivotal hole 242, a second pivotal hole 243 and a carrier 244. The first pivotal hole 242 and the second pivotal hole 243 are respectively located beside two opposite sides of the accommodation recess 241. The carrier 244 is located beside the second pivotal hole 243. The carrier 244 is externally extended in the direction away from the first pivotal hole 242. In addition, at least one positioning hole 2441 is formed in the carrier 244.

The wheel disc 21 is pivotally coupled to the supporting base 24. A portion of the wheel disc 21 is received within the accommodation recess 241. The wheel disc 21 can be rotated along a rotation axis line 211. Hereinafter, the direction parallel to the rotation axis line 211 is referred as an axial direction, and the direction perpendicular to the rotation axis line 211 is referred as a radial direction.

The wheel disc 21 includes a first lateral disc part 212, a second lateral disc part 213, a pivotal part 214, an outer disc part 215 and a shaft rod 216. The first lateral disc part 212 and the second lateral disc part 213 are opposed to each other. The outer disc part 215 is arranged around the first lateral disc part 212 and the second lateral disc part 213. When the roller module 2 is operated by the user, the outer disc part 215 is touched by the user's finger. Optionally, the outer disc part 215 is additionally equipped with an anti-slip ring, and the outer disc part 215 is covered with an anti-slip ring. When the anti-slip ring is touched by the user's finger, another operating feel is provided to the user.

In this embodiment, the pivotal part 214 of the wheel disc 21 includes a first shaft sleeve 2141 and a second shaft sleeve 2142. The first shaft sleeve 2141 is externally extended from the first lateral disc part 212 of the wheel disc 21. The second shaft sleeve 2142 is externally extended from the second lateral disc part 213 of the wheel disc 21. The shaft rod 216 is penetrated through and fixed in the first shaft sleeve 2141 and the second shaft sleeve 2142. In addition, the two ends of the shaft rod 216 are respectively inserted into the first pivotal hole 242 and the second pivotal hole 243 of the supporting base 24. Consequently, the wheel disc 21 can be pivotally installed on the supporting base 24. The magnetic conductor 22 is sheathed around and fixed on the first shaft sleeve 2141. Consequently, the magnetic conductor 22 can be synchronously rotated with the wheel disc 21. In a variant example, the magnetic conductor 22 is sheathed around and fixed on the shaft rod 216, and the magnetic conductor 22 can be synchronously rotated with the wheel disc 21

In an embodiment, the rotation sensor 25 includes a magnetic turntable 251 and a sensing chip 252. The magnetic turntable 251 is divided into at least one N-pole region and one S-pole region. For example, the sensing chip 252 is a Hall IC. The magnetic turntable 251 is sheathed around and fixed on the second shaft sleeve 2142. Consequently, the magnetic turntable 251 and the wheel disc 21 can be rotated synchronously, and the rotation state of the wheel disc 21 can be detected by the sensing chip 252. In a variant example, the magnetic turntable 251 is installed in the second shaft sleeve 2142, or the magnetic turntable 251 is sheathed around and fixed on the shaft rod 216. Similarly, the magnetic turntable 251 and the wheel disc 21 can be rotated synchronously, and the rotation states of the magnetic turntable 251 and the wheel disc 21 can be detected by the sensing chip 252.

In this embodiment, the magnetic conductor 22 and the magnetic turntable 251 of the rotation sensor 25 are respectively sheathed around the first shaft sleeve 2141 and the second shaft sleeve 2142 of the wheel disc 21. Consequently, the rotation equilibrium of the wheel disc 21 will be more stable. Furthermore, the wheel disc 21 is stably and pivotally installed on the supporting base 24 through the first shaft sleeve 2141, the second shaft sleeve 2142 and the shaft rod 216. Consequently, the durability of the wheel disc 21 can be maintained and not influenced by the presence of the electro-permanent magnet assembly 23.

In this embodiment, the magnetic conductor 22 and the wheel disc 21 are coaxially arranged and rotated synchronously. The magnetic conductor 22 includes a hub 221 and plural spokes 222. The plural spokes 222 are radially extended from the hub 221. In addition, the plural spokes 222 are in a radial arrangement. Furthermore, the roller module 2 is equipped with a spacer 26 (e.g., a washer) between the magnetic conductor 22 and the wheel disc 21. Due to the arrangement of the spacer 26, the axial distance between the magnetic conductor 22 and the wheel disc 21 or the axial distance between the magnetic conductor 22 and the electro-permanent magnet assembly 23 can be adjusted according to the practical requirements.

The electro-permanent magnet assembly 23 is located beside the magnetic conductor 22. The magnetic conductor 22 is arranged between the wheel disc 21 and the electro-permanent magnet assembly 23 along an axial direction parallel with the rotation axis line 211. The electro-permanent magnet assembly 23 can be selectively operated in a first operating status or a second operating status. When the electro-permanent magnet assembly 23 is operated in the first operating status, the electro-permanent magnet assembly 23 provides a first magnetic attraction force to at least one spoke 222 of the plural spokes 222 in the axial direction. When the electro-permanent magnet assembly 23 is operated in the second operating status, the electro-permanent magnet assembly 23 provides a second magnetic attraction force to at least one spoke 222 of the plural spokes 222 in the axial direction. The first magnetic attraction force is greater than the second magnetic attraction force.

Regardless of whether the wheel disc 21 is pivotally installed on the supporting base 24 through the first shaft sleeve 2141, the second shaft sleeve 2142 and the shaft rod 216 or the wheel disc 21 is pivotally installed on the supporting base 24 through the first rotation shaft 2143 and the second rotation shaft 2144, the complete and firm rotation structure of the wheel disc 21 can be maintained. That is, it is not necessary to enlarge the size of the wheel disc 21 in response to the arrangement of the electro-permanent magnet assembly 23, or it is not necessary to reserve a large inner space to install the electro-permanent magnet assembly 23. Furthermore, it is also the benefit and advantage of the present invention that the electro-permanent magnet assembly 23 provides the rotation resistance force to the wheel disc 21 in the axial direction.

The electro-permanent magnet assembly 23 includes a first permanent magnet 231, a coil 232, a second permanent magnet 233, a third permanent magnet 234, a first magnetic conduction block 235, a second magnetic conduction block 236 and a bracket 237.

The first permanent magnet 231 has a first magnetic pole terminal 2311 and a second magnetic pole terminal 2312. The coil 232 is wound around the first permanent magnet 231. When a current flows through the coil 232, the operating status of the electro-permanent magnet assembly 23 is switched from the first operating status to the second operating status or switched from the second operating status back to the first operating status. The second permanent magnet 233 has a third magnetic pole terminal 2331 and a fourth magnetic pole terminal 2332. The third permanent magnet 234 has a fifth magnetic pole terminal 2341 and a sixth magnetic pole terminal 2342.

The first magnetic conduction block 235 is magnetically coupled with the first magnetic pole terminal 2311 of the first permanent magnet 231 and the third magnetic pole terminal 2331 of the second permanent magnet 233. The first magnetic conduction block 235 includes a first connecting part 2351 and a first protrusion part 2352. The first connecting part 2351 is connected with the first magnetic pole terminal 2311 and the third magnetic pole terminal 2331. The first protrusion part 2352 is axially protruded from the first connecting part 2351 and protruded in the direction toward the magnetic conductor 22. In addition, the first protrusion part 2352 is located near at least one spoke 222 of the plural spokes 222. In this embodiment, the first protrusion part 2352 includes plural first claws 23521, and the plural first claws 23521 are in a radial arrangement with the rotation axis line 211 as the center. As shown in FIG. 10, each first claw 23521 is aligned with a nearby spoke 222 of the plural spokes 222.

The second magnetic conduction block 236 is magnetically coupled with the second magnetic pole terminal 2312 of the first permanent magnet 231 and the sixth magnetic pole terminal 2342 of the third permanent magnet 234. The second magnetic conduction block 236 includes a second connecting part 2361 and a second protrusion part 2362. The second connecting part 2361 is connected with the second magnetic pole terminal 2312 and the sixth magnetic pole terminal 2342. The second protrusion part 2362 is axially protruded from the second connecting part 2361 and protruded in the direction toward the magnetic conductor 22. In addition, the second protrusion part 2362 is located near at least one spoke 222 of the plural spokes 222. In this embodiment, the second protrusion part 2362 includes plural second claws 23621, and the plural second claws 23621 are in a radial arrangement with the rotation axis line 211 as the center. As shown in FIG. 10, each second claw 23621 is aligned with a nearby spoke 222 of the plural spokes 222.

In the above embodiment, the roller module 2 is equipped with both of the first protrusion part 2352 and the second protrusion part 2362. In some variant examples, the roller module 2 is equipped with one of the first protrusion part 2352 and the second protrusion part 2362. Furthermore, the roller module 2 of the first embodiment is additionally equipped with a magnetic conduction sheet 238. The fourth magnetic pole terminal 2332 of the second permanent magnet 233 and the fifth magnetic pole terminal 2341 of the third permanent magnet 234 are magnetically coupled with each other through the magnetic conduction sheet 238. For example, the magnetic conduction sheet 238 is an iron sheet.

When the electro-permanent magnet assembly 23 is operated in the first operating status, the magnetic polarity of the first magnetic pole terminal 2311 of the first permanent magnet 231, the magnetic polarity of the third magnetic pole terminal 2331 of the second permanent magnet 233 and the magnetic polarity of the fifth magnetic pole terminal 2341 of the third permanent magnet 234 are identical. Consequently, the magnetic field lines 3 generated by the electro-permanent magnet assembly 23 are transmitted to the magnetic conductor 22 through the first magnetic conduction block 235 or the second magnetic conduction block 236. Under this circumstance, the first magnetic conduction block 235 or the second magnetic conduction block 236 of the electro-permanent magnet assembly 23 provides the first magnetic attraction force to at least one spoke 222 of the plural spokes 222 of the magnetic conductor 22 in the axial direction. If the wheel disc 21 is rotated when the electro-permanent magnet assembly 23 is operated in the first operating status, the plural spokes 222 are alternately close to and then away from the first magnetic conduction block 235 or the second magnetic conduction block 236. During the rotation of the wheel disc 21, the wheel disc 21 linked with the magnetic conductor 22 receives the axial rotation resistance forces (or intermittent strong and weak magnetic attraction forces) in the axial direction. Consequently, a stepped rotation feel or an intermittent rotation feel is provided to the user's finger. Under this circumstance, the rotating wheel disc 21 is in the stepped rotation mode or the intermittent rotation mode.

As mentioned above, in the roller module 2, the electro-permanent magnet assembly 23 provides the rotation resistance forces to the wheel disc 21 and the magnetic conductor 22 in the axial direction. In addition, the size and arrangement relationships between the first magnetic conduction block 235 or the second magnetic conduction block 236 and the plural spokes 222 of the magnetic conductor 22 in the axial direction are similar. In comparison with the radial rotation resistance forces, the electro-permanent magnet assembly 23 provides a stronger stepped rotation feel to the wheel disc 21 or the magnetic conductor 22 when the roller module 2 is operated in the stepped rotation mode. In case that the roller module is applied to a different target or the application target needs different degrees of stepped feedback in different models, the distance between the first magnetic conduction block 235 and the spokes 222 of the magnetic conductor 22 in the axial direction and the distance between the second magnetic conduction block 236 and the spokes 222 of the magnetic conductor 22 in the axial direction may be adjusted to achieve this purpose. Due to this structural design, the adjustment in the axial direction has the least impact on other components in the roller module 2 and is easier to achieve. For example, in a variant example, the length of the first protrusion part 2352 or the second protrusion part 2362 in the axial direction is replaced by another protrusion part is changed. In another variant example, the depth of a first locking recess 2372 or a second locking recess 2373 in the bracket 227 is changed. Alternatively, the thickness of the spacer 26 is changed.

When the electro-permanent magnet assembly 23 is operated in the second operating status, the magnetic poles of the two magnetic pole terminals of the first permanent magnet 231 are exchanged. Consequently, the magnetic polarity of the second magnetic pole terminal 2312 of the first permanent magnet 231, the magnetic polarity of the third magnetic pole terminal 2331 of the second permanent magnet 233 and the magnetic polarity of the fifth magnetic pole terminal 2341 of the third permanent magnet 234 are identical. Meanwhile, most of the magnetic field lines 4 generated by the electro-permanent magnet assembly 23 will be circulated inside the electro-permanent magnet assembly 23. In addition, the first magnetic conduction block 235 or the second magnetic conduction block 236 provides a second magnetic attraction force to at least one spoke 222 of the plural spokes 222 of the magnetic conductor 22 in the axial direction. Consequently, the second magnetic attraction force is smaller than the first magnetic attraction force, or the second magnetic attraction force approaches zero. During the rotation of the wheel disc 21, the wheel disc 21 receives a tiny axial rotation resistance force only. In other words, the stepped rotation feel or the intermittent rotation feel provided to the user's finger is not obvious. Under this circumstance, the wheel disc 21 is in a non-stepped rotation mode, a hyper-fast rotation mode or a smooth rotation mode. Whenever the wheel disc 21 is rotated, the wheel disc 21 can be continuously rotated for a certain time period before stopping.

The mechanism for switching the operating status of the electro-permanent magnet assembly 23 from the first operating status to the second operating status or switching the operating status of the electro-permanent magnet assembly 23 from the second operating status to the first operating status will be described in more details as follows. In accordance with a feature of the present invention, the magnetic pole distribution of the first permanent magnet 231 is changed when the direction of the current flowing through the coil 232 is changed. In addition, the direction of the current flowing through the coil 232 is opposed to the previous current direction after the operating mode is changed. Consequently, the magnetic pole distribution of the first permanent magnet 231 can be changed, and the operating status of the electro-permanent magnet assembly 23 can be alternately switched between the first operating status and the second operating status. In an embodiment, the first permanent magnet 231 is a magnet with low coercivity. The coil 232 is wound around the first permanent magnet 231. By changing the direction of the current flowing through the coil 232, the magnetic pole distribution of the first permanent magnet 231 will be changed.

In an embodiment, the mouse 1 is equipped with a switching key 15. After the switching key 15 is triggered, the operating status of the electro-permanent magnet assembly 23 is switched. In another embodiment, the operating status of the electro-permanent magnet assembly 23 is automatically switched according to the detection result of the rotation sensor 25. For example, if the rotation sensor 25 detects that the user rotates the wheel disc 21 quickly and continuously in a short period of time or the rotation sensor 25 detects that the rotation speed of the wheel disc 21 has reached a preset upper limit, the electro-permanent magnet assembly 23 of the roller module 2 will be switched from the first operating status to the second operating status. Whereas, if the above-mentioned behavior disappears or the above-mentioned condition is not satisfied, the electro-permanent magnet assembly 23 of the roller module 2 will be switched from the second operating status to the first operating status. Furthermore, the battery 14 in the mouse 1 can provide electric power for switching the operating status of the electro-permanent magnet assembly 23.

In an embodiment, the wheel disc 23 is rotated in the stepped rotation mode when the electro-permanent magnet assembly 23 is in the first operating status, and the current flows through the coil 232 in a first current direction 5 shown in FIG. 8 and FIG. 10 to drive the coil 232. Consequently, the first magnetic pole terminal 2311 of the first permanent magnet 231 is the S pole terminal, and the second magnetic pole terminal 2312 is the N pole terminal. Under this circumstance, the third magnetic pole terminal 2331 of the second permanent magnet 233 is the S pole terminal, the fourth magnetic pole terminal 2332 of the second permanent magnet 233 is the N pole terminal, the fifth magnetic pole terminal 2341 of the third permanent magnet 234 is the S pole terminal, and the sixth magnetic pole terminal 2342 is the N pole terminal. In addition, the wheel disc 21 is rotated in the non-stepped rotation mode when the electro-permanent magnet assembly 23 is in the second operating status, and the current flows through the coil 232 in a second current direction 6 shown in FIG. 9 and FIG. 10 to drive the coil 232. Consequently, the first magnetic pole terminal 2311 of the first permanent magnet 231 is the N pole terminal, and the second magnetic pole terminal 2312 is the S pole terminal. Under this circumstance, the third magnetic pole terminal 2331 of the second permanent magnet 233 is still the S pole terminal, the fourth magnetic pole terminal 2332 of the second permanent magnet 233 is still the N pole terminal, the fifth magnetic pole terminal 2341 of the third permanent magnet 234 is still the S pole terminal, and the sixth magnetic pole terminal 2342 is still the N pole terminal.

In another embodiment, the wheel disc 21 is rotated in the stepped rotation mode when the electro-permanent magnet assembly 23 is in the first operating status, and the magnetic pole distribution is modified. For example, the first magnetic pole terminal 2311 of the first permanent magnet 231 is the N pole terminal, the second magnetic pole terminal 2312 is the S pole terminal, the third magnetic pole terminal 2331 of the second permanent magnet 233 is the N pole terminal, the fourth magnetic pole terminal 2332 of the second permanent magnet 233 is the S pole terminal, the fifth magnetic pole terminal 2341 of the third permanent magnet 234 is the N pole terminal, and the sixth magnetic pole terminal 2342 is the S pole terminal. In addition, the wheel disc 21 is rotated in the non-stepped rotation mode when the electro-permanent magnet assembly 23 is in the second operating status, and the magnetic pole distribution is modified. For example, the first magnetic pole terminal 2311 of the first permanent magnet 231 is the S pole terminal, the second magnetic pole terminal 2312 is the N pole terminal, the third magnetic pole terminal 2331 of the second permanent magnet 233 is the N pole terminal, the fourth magnetic pole terminal 2332 of the second permanent magnet 233 is the S pole terminal, the fifth magnetic pole terminal 2341 of the third permanent magnet 234 is the N pole terminal, and the sixth magnetic pole terminal 2342 is the S pole terminal.

In the roller module 2, the bracket 237 is used for fixing the first permanent magnet 231, the coil 232, the second permanent magnet 233, the third permanent magnet 234, the first magnetic conduction block 235, the second magnetic conduction block 236 and the magnetic conduction sheet 238. The bracket 237 is fixed on the supporting base 24. Consequently, a fixed distance between the first magnetic conduction block 235 and the spokes 222 of the magnetic conductor 22 in the axial direction and a fixed distance between the second magnetic conduction block 236 and the spokes 222 of the magnetic conductor 22 in the axial direction can be maintained.

In an embodiment, the bracket 237 includes a central receiving structure 2371, a first locking recess 2372, a second locking recess 2373 and at least one positioning rod 2374. The at least one positioning rod 2374 is located under the central receiving structure 2371. The at least one positioning rod 2374 is aligned with the corresponding positioning hole 2441 in the carrier 244. After the at least one positioning rod 2374 is inserted into the corresponding positioning hole 2441, the bracket 237 is fixed on and assembled with the supporting base 24.

The first permanent magnet 231 is received within the central receiving structure 2371 of the bracket 237. The coil 232 is wound around the central receiving structure 2371 and arranged around the first permanent magnet 231. The first locking recess 2372 and the second locking recess 2373 are respectively located beside two opposite sides of the central receiving structure 2371.

The first locking recess 2372 includes at least one first opening 23721. When the first magnetic conduction block 235 is installed in the first locking recess 2372, the first connecting part 2351 of the first magnetic conduction block 235 is engaged with the at least one first opening 23721 of the first locking recess 2372 and unable to pass through. Meanwhile, the first protrusion part 2352 of the first magnetic conduction block 235 is inserted into the at least one first opening 23721, or the first protrusion part 2352 of the first magnetic conduction block 235 is transferred through and protruded outside the at least one first opening 23721. Consequently, the first protrusion part 2352 of the first magnetic conduction block 235 is closer to the magnetic conductor 22 and the spokes 222 than the first permanent magnet 231, the second permanent magnet 233 or the third permanent magnet 234 in the axial direction. Preferably, the number and arrangement of the at least one first opening 23721 of the first locking recess 2372 match the number and arrangement of the at least one first claw 23521 of the first protrusion part 2352 of the first magnetic conduction block 235. In case that the at least one first protrusion part 2352 includes plural first claws 23521 and the at least one first opening 23721 of the first locking recess 2372 includes plural first openings 23721, the plural first claws 23521 are in a radial arrangement with the rotation axis line 211 as the center, and the plural first openings 23721 are in a radial arrangement with the rotation axis line 211 as the center. In a variant example, the first opening 23721 of the first locking recess 2372 is large enough for allowing plural first claws 23521 to insert into or pass through the first opening 23721, but the first connecting part 2351 of the first magnetic conduction block 235 is unable to pass through.

Similarly, the second locking recess 2373 includes at least one second opening 23731. When the second magnetic conduction block 236 is installed in the second locking recess 2373, the second connecting part 2361 of the second magnetic conduction block 236 is engaged with the at least one second opening 23731 of the second locking recess 2373 and unable to pass through. Meanwhile, the second protrusion part 2362 of the second magnetic conduction block 236 is inserted into the at least one second opening 23731, or the second protrusion part 2362 of the second magnetic conduction block 236 is transferred through and protruded outside the at least one second opening 23731. Consequently, the second protrusion part 2362 of the second magnetic conduction block 236 is closer to the magnetic conductor 22 and the spokes 222 than the first permanent magnet 231, the second permanent magnet 233 or the third permanent magnet 234 in the axial direction. Preferably, the number and arrangement of the at least one second opening 23731 of the second locking recess 2373 match the number and arrangement of the at least one second claw 23621 of the second protrusion part 2362 of the second magnetic conduction block 236. In case that the at least one second protrusion part 2362 includes plural second claws 23621 and the at least one second opening 23731 of the second locking recess 2373 includes plural first openings 23721, the plural second claws 23621 are in a radial arrangement with the rotation axis line 211 as the center, and the plural first openings 23721 are in a radial arrangement with the rotation axis line 211 as the center. In a variant example, the second opening 23731 of the second locking recess 2373 is large enough for allowing plural second claws 23621 to insert into or pass through the second opening 23731, but the second connecting part 2361 of the second magnetic conduction block 236 is unable to pass through.

Figure 11:
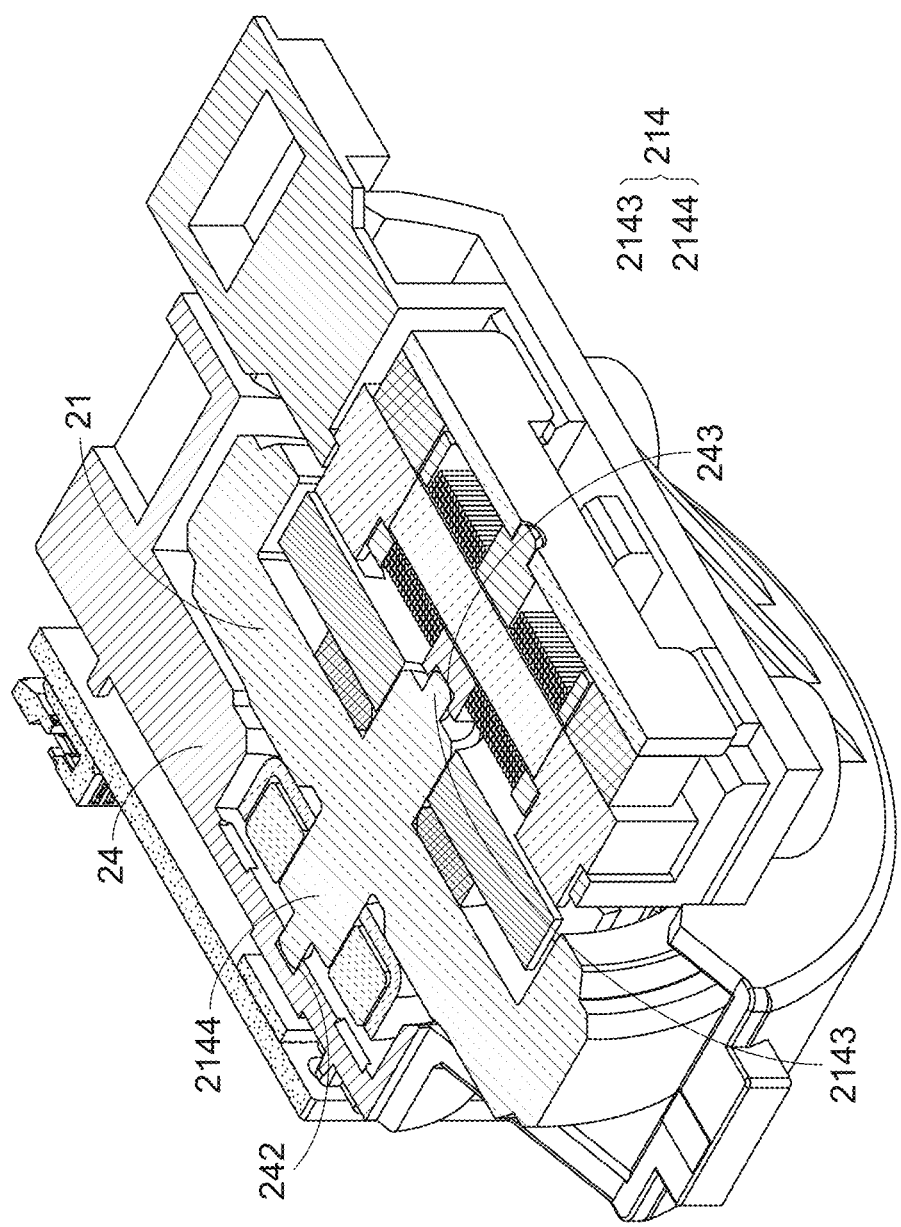
FIG. 11 is a schematic cutaway view illustrating a variant example of the roller module according to the first embodiment of the present invention.

In this embodiment, the wheel disc 21 is pivotally installed on the supporting base 24 through the first shaft sleeve 2141, the second shaft sleeve 2142 and the shaft rod 216. FIG. 11 is a schematic cutaway view illustrating a variant example of the roller module according to the first embodiment of the present invention. As shown in FIG. 11, the first shaft sleeve 2141 and the shaft rod 216 are integrated as a first rotation shaft 2143, and the second shaft sleeve 2142 and the shaft rod 216 are integrated as a second rotation shaft 2144. In other words, the wheel disc 21 includes the first rotation shaft 2143 and the second rotation shaft 2144. The first rotation shaft 2143 is externally protruded from the first lateral disc part 212 of the wheel disc 21. The second rotation shaft 2144 is externally protruded from the second lateral disc part 213 of the wheel disc 21. The distal end of the first rotation shaft 2143 is inserted into the first pivotal hole 242 of the supporting base 24. The distal end of the second rotation shaft 2144 is inserted into the second pivotal hole 243 of the supporting base 24. In case that the wheel disc 21 includes the first rotation shaft 2143 and the second rotation shaft 2144, the magnetic conductor 22 is sheathed around and fixed on the first rotation shaft 2143, and the magnetic turntable 251 of the rotation sensor 25 is sheathed around and fixed on the second rotation shaft 2144. Consequently, the magnetic turntable 251 and the wheel disc 21 can be rotated synchronously, and the rotation states of and the magnetic turntable 251 and the wheel disc 21 can be detected by the sensing chip 252.

Figure 12:
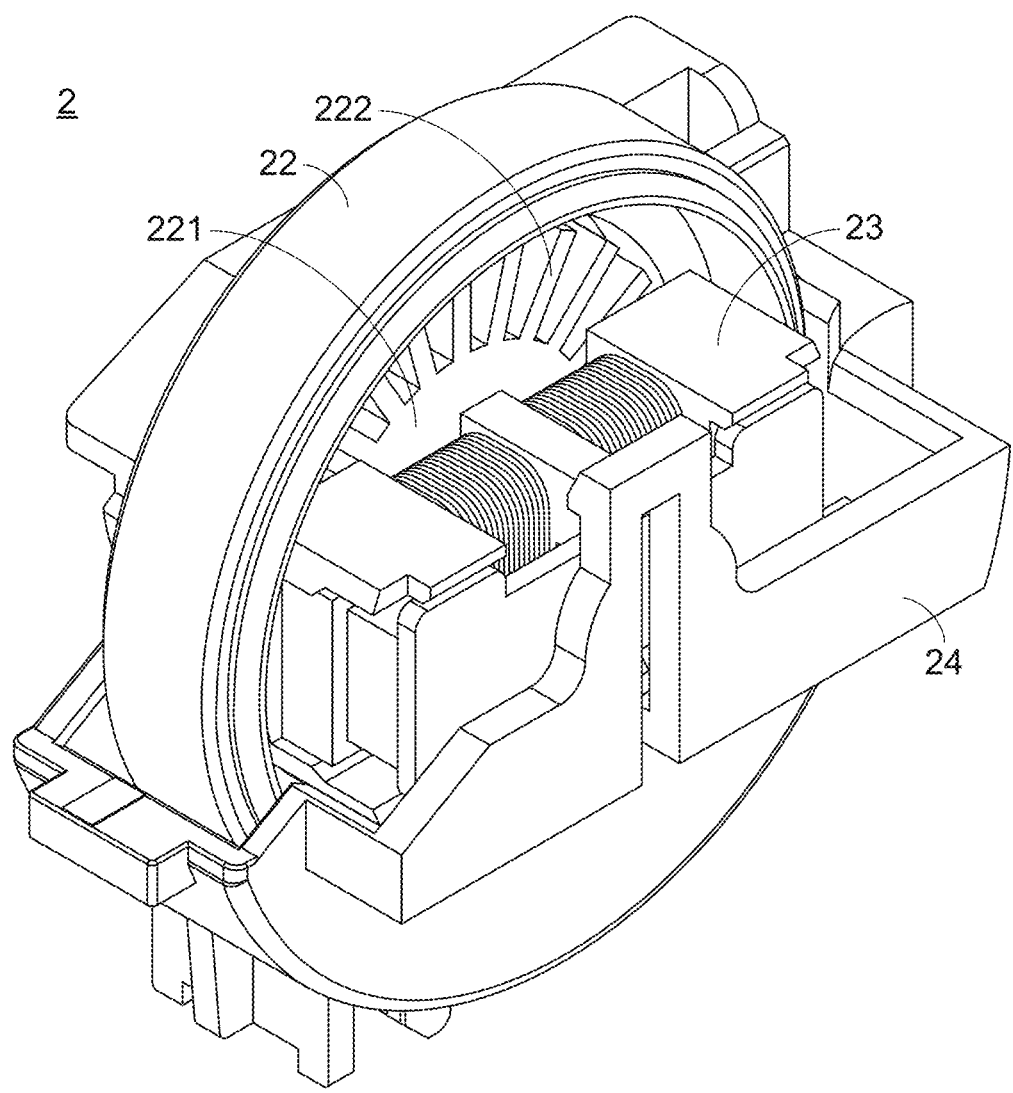
FIG. 12 is a schematic perspective view illustrating a roller module according to a second embodiment of the present invention.
Figure 13:
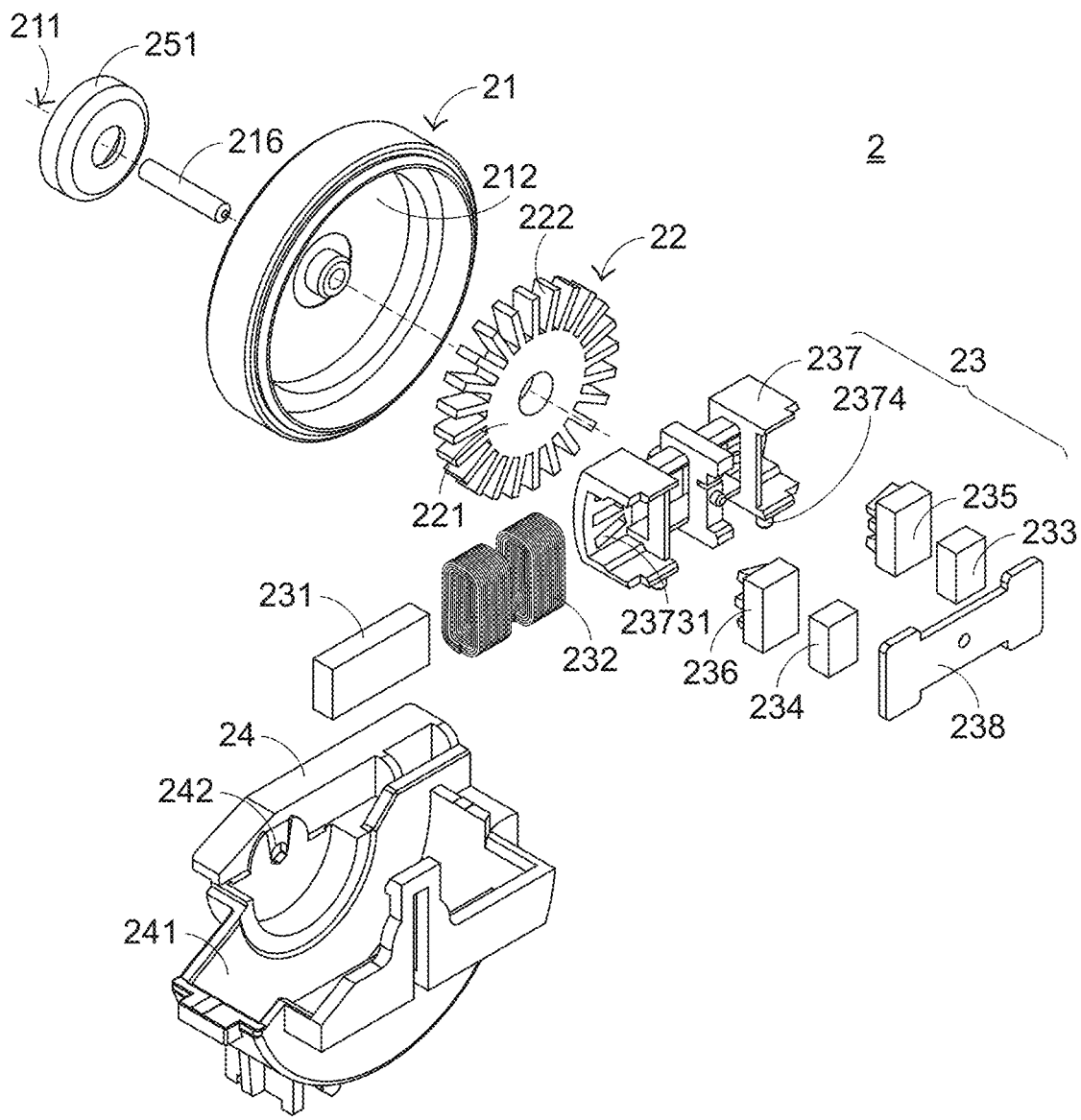
FIG. 13 is a schematic exploded view illustrating the roller module shown in FIG. 12 and taken along a viewpoint.
Figure 14:
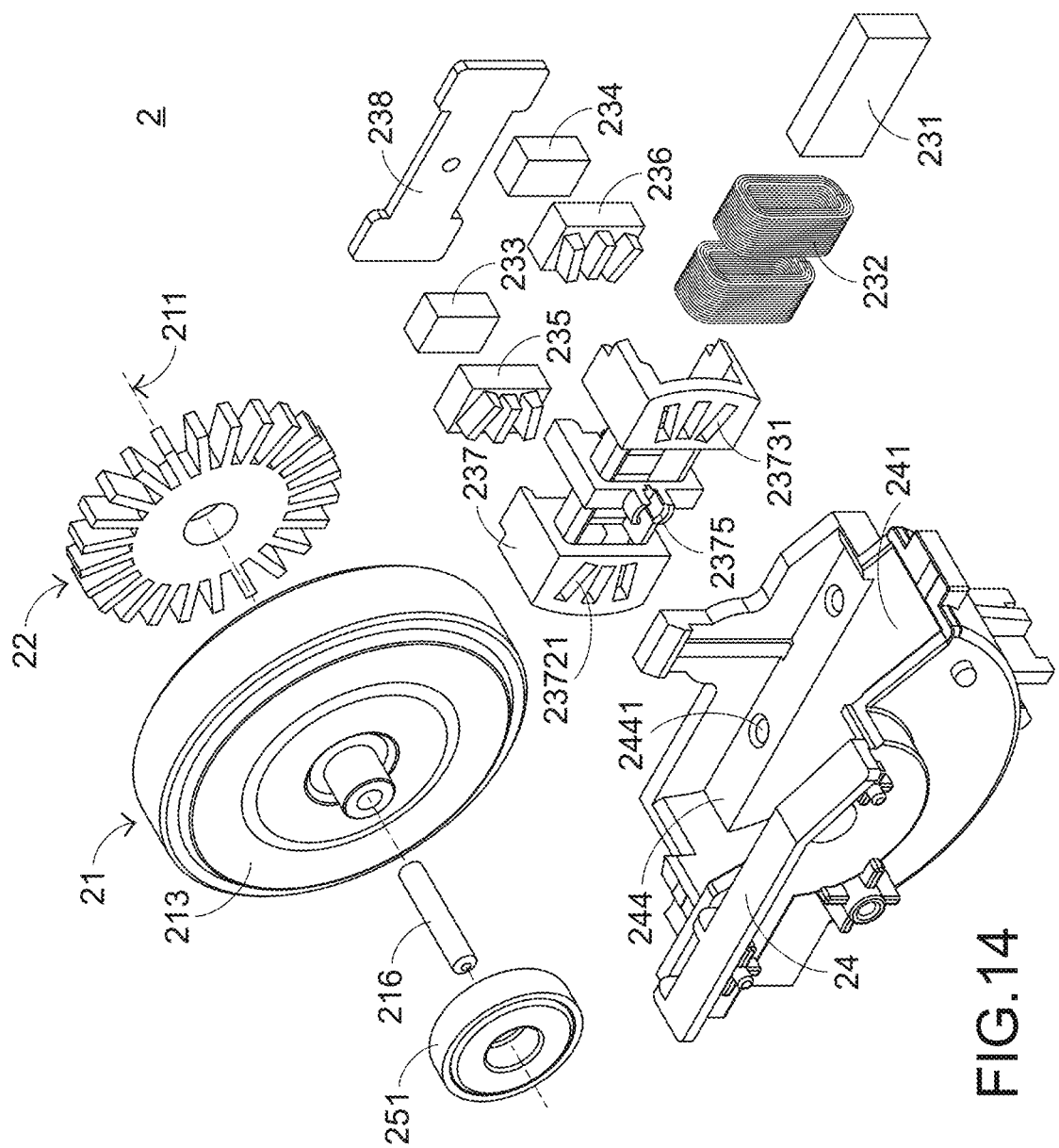
FIG. 14 is a schematic exploded view illustrating the mouse shown in FIG. 12 and taken along another viewpoint.
Figure 15:
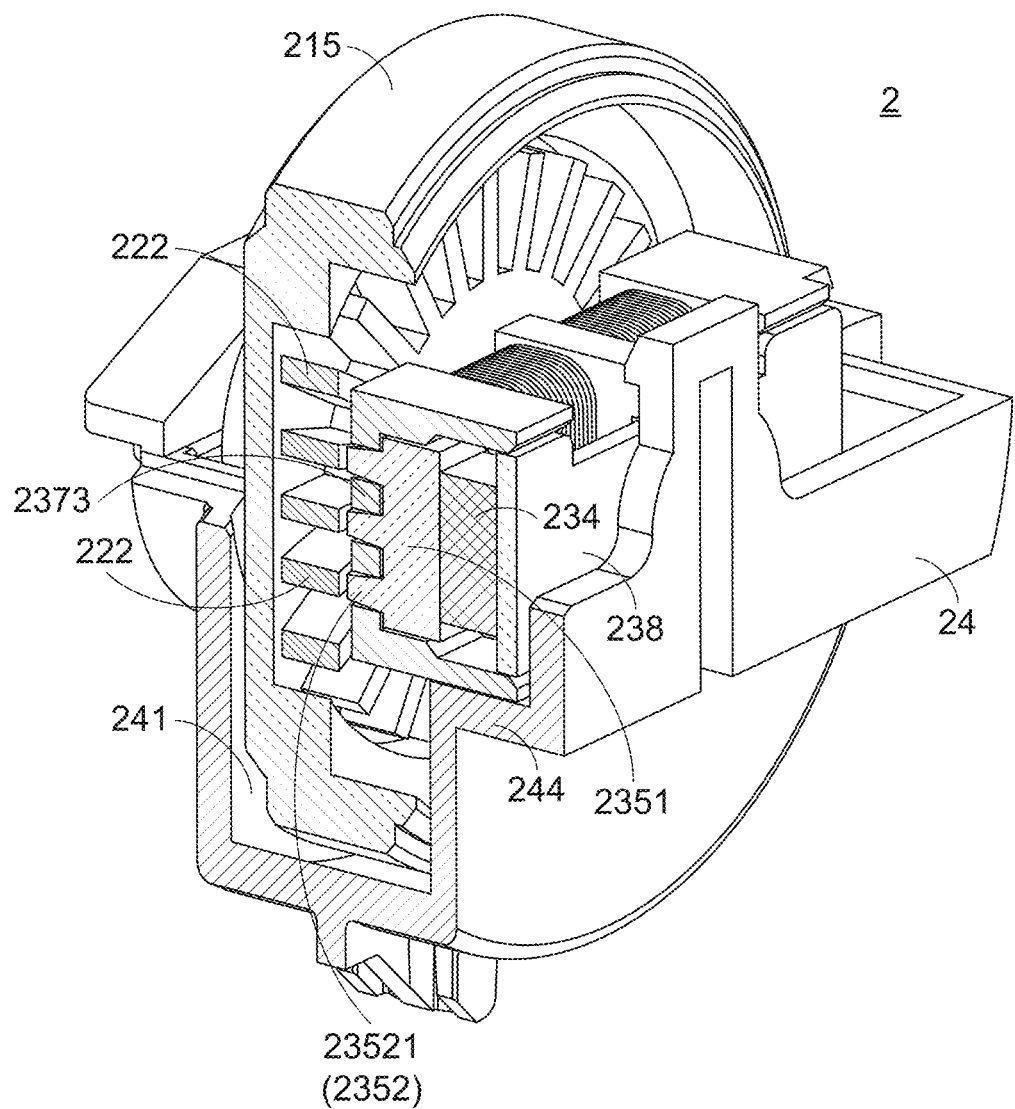
FIG. 15 is a schematic cutaway view illustrating the roller module shown in FIG. 12 and taken along a viewpoint.
Figure 16:
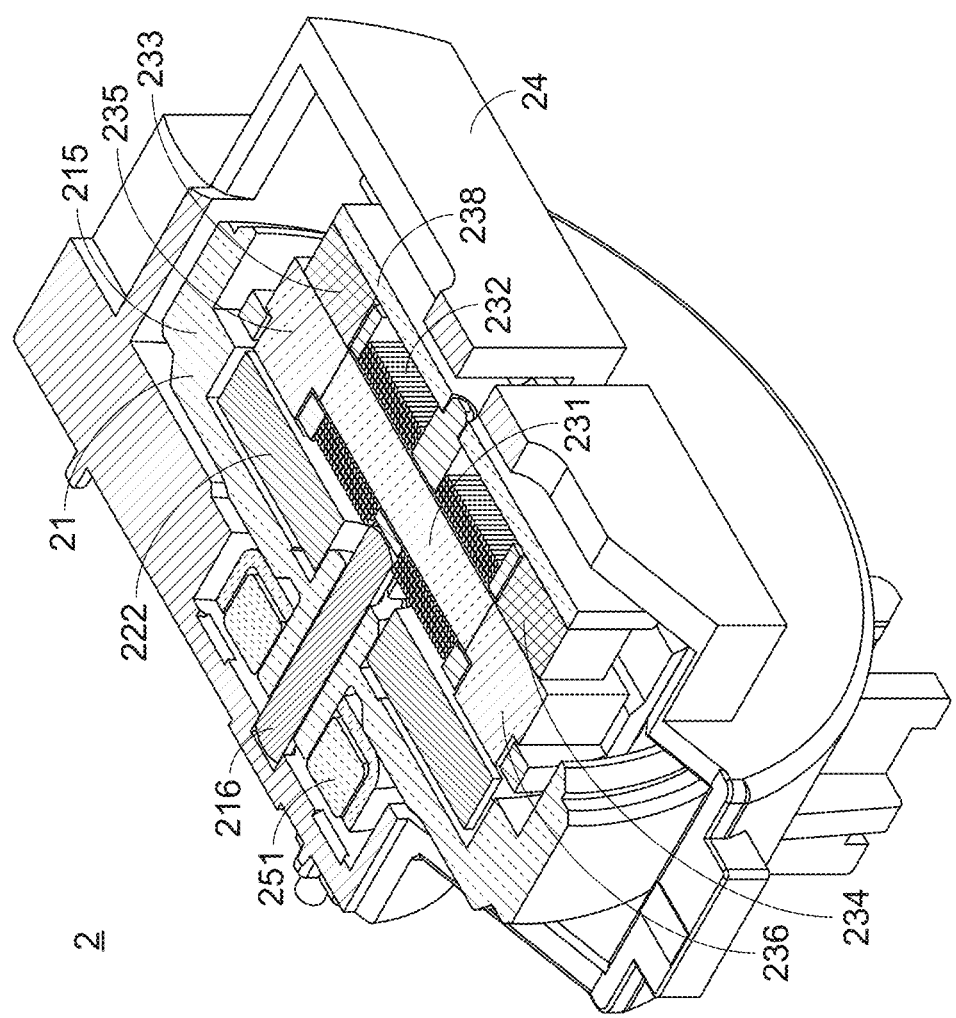
FIG. 16 is a schematic cutaway view illustrating the roller module shown in FIG. 12 and taken along another viewpoint.

FIG. 12 is a schematic perspective view illustrating a roller module according to a second embodiment of the present invention. FIG. 13 is a schematic exploded view illustrating the roller module shown in FIG. 12 and taken along a viewpoint. FIG. 14 is a schematic exploded view illustrating the mouse shown in FIG. 12 and taken along another viewpoint. FIG. 15 is a schematic cutaway view illustrating the roller module shown in FIG. 12 and taken along a viewpoint. FIG. 16 is a schematic cutaway view illustrating the roller module shown in FIG. 12 and taken along another viewpoint.

An example of a roller module according to the second embodiment of the present invention will be described with reference to FIGS. 12 to 16. In comparison with the first embodiment, the electro-permanent magnet assembly 23 of the roller module 2 of the second embodiment is installed in the supporting base 24. In this embodiment, second pivotal hole 243 is not formed in the supporting base 24, but the second pivotal hole is formed in the bracket 237 of the electro-permanent magnet assembly 23. The other components and the operations of the roller module 2 of the second embodiment are similar to those of the first embodiment, and not redundantly described herein.

In the roller module 2 of the second embodiment, the first pivotal hole 242 is located above the accommodation recess 241. The carrier 244 is externally extended from a side of the accommodation recess 241 opposed to the first pivotal hole 242 and extended in the direction away from the first pivotal hole 242. In addition, at least one positioning hole 2441 is formed in the carrier 244. In this embodiment, the second pivotal hole 2375 is formed in the bracket 237 of the electro-permanent magnet assembly 23. In addition, at least one positioning rod 2374 is formed on the bottom side of the bracket 237. After the at least one positioning rod 2374 of the bracket 237 is inserted into the corresponding positioning hole 2441 of the carrier 244, the electro-permanent magnet assembly 23 is fixed on and assembled with the supporting base 24. Under this circumstance, the first pivotal hole 242 of the supporting base 24 and the second pivotal hole 2375 of the bracket 237 are respectively located two opposite sides of the accommodation recess 241. Consequently, the wheel disc 21 is pivotally installed through the first pivotal hole 242 and the second pivotal hole 2375.

Figure 17:
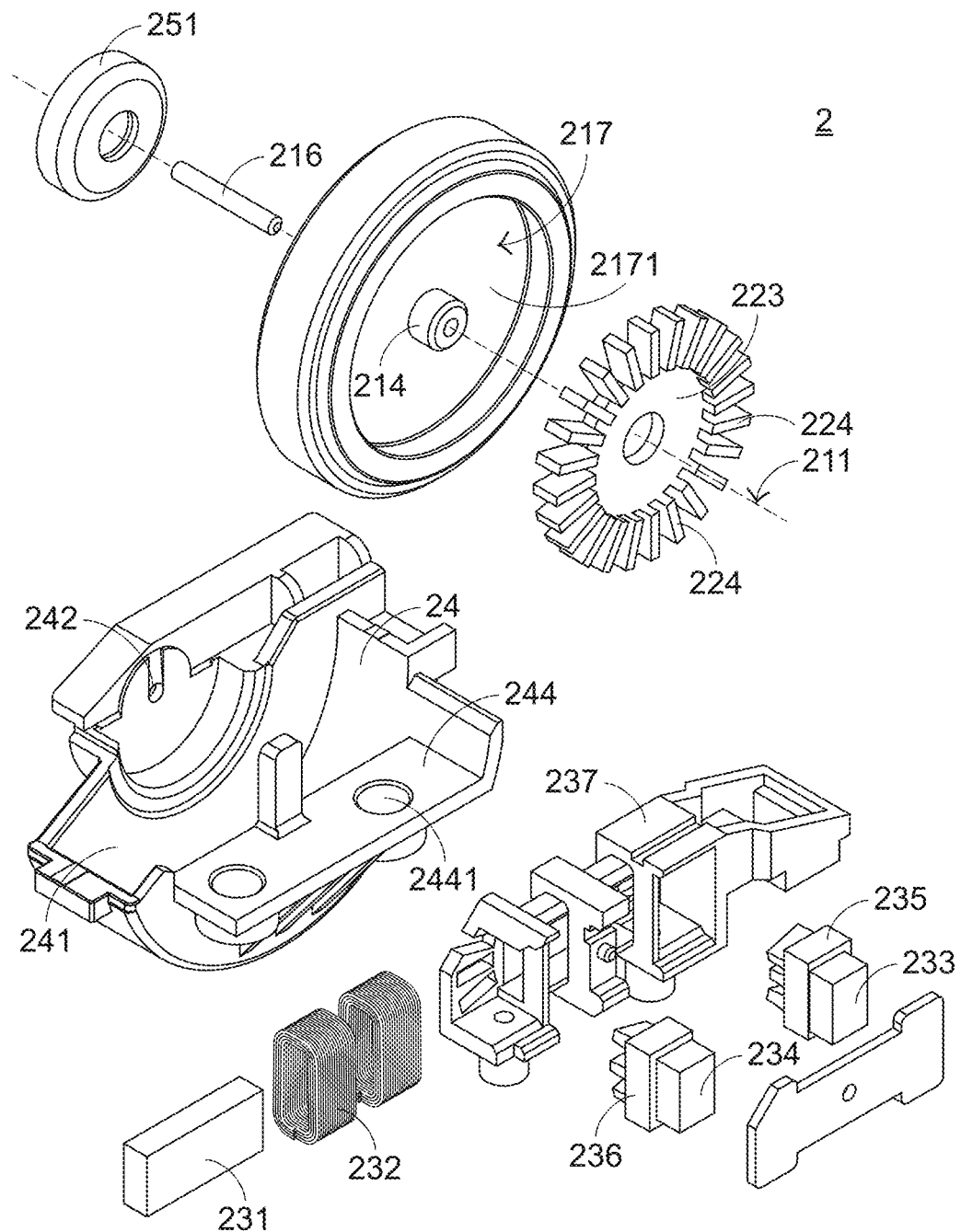
FIG. 17 is a schematic exploded view illustrating a roller module according to a third embodiment of the present invention.
Figure 18:
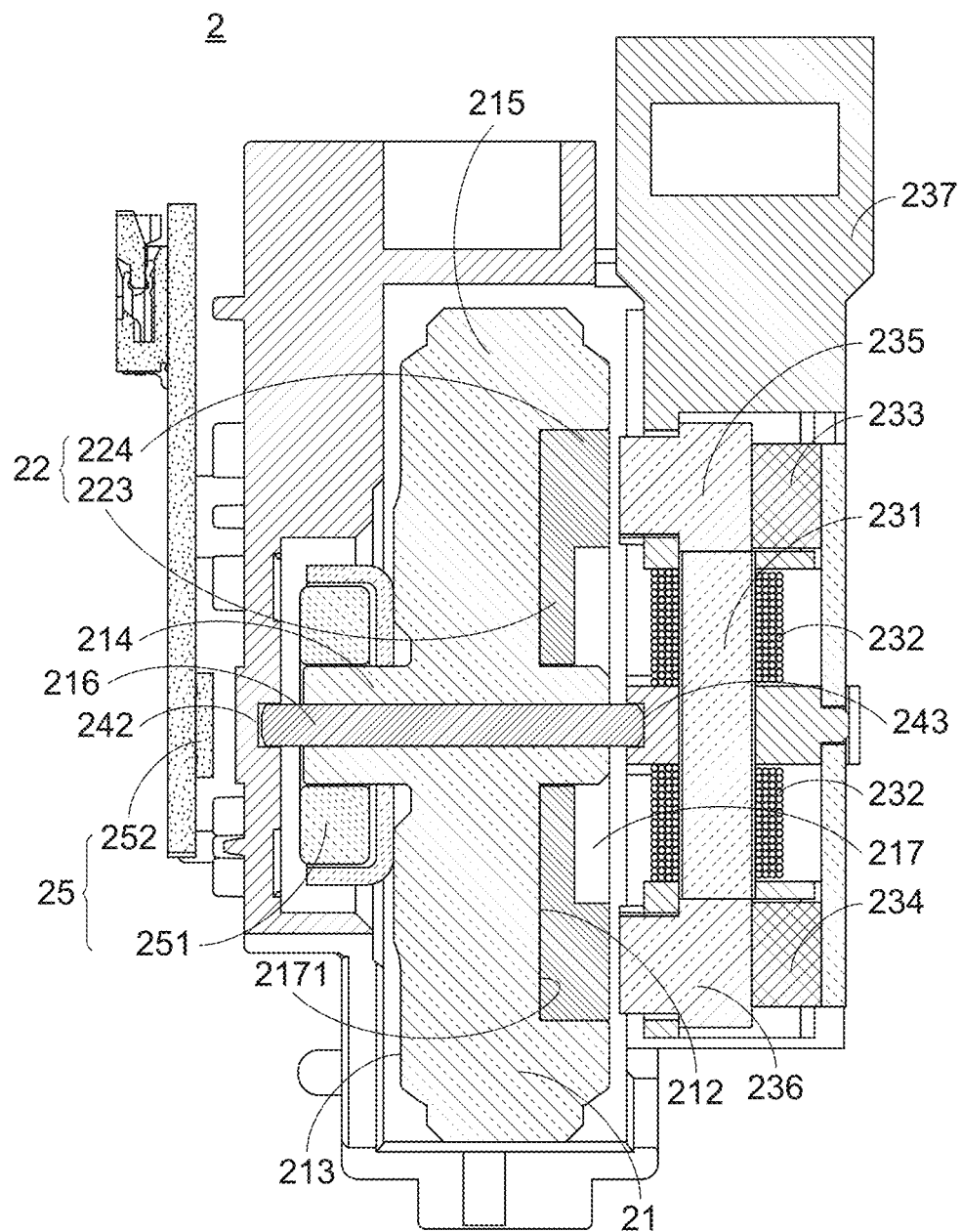
FIG. 18 is a schematic cutaway view illustrating the roller module according to the third embodiment of the present invention.

FIG. 17 is a schematic exploded view illustrating a roller module according to a third embodiment of the present invention. FIG. 18 is a schematic cutaway view illustrating the roller module according to the third embodiment of the present invention. In comparison with the first embodiment and the second embodiment, the magnetic conductor 22 in the roller module 2 of the third embodiment is embedded in the wheel disc 21. The structure of the magnetic conductor 22 is not restricted to the structure of the magnetic conductor 22 in the first embodiment or the second embodiment. The structure of the magnetic conductor 22 in the embodiment is distinguished. The other components and the operations of the roller module 2 of the second embodiment are similar to those of the first embodiment or the second embodiment, and not redundantly described herein.

In the roller module 2 of the third embodiment, the wheel disc 21 includes an accommodation structure 217. The accommodation structure 217 is concavely formed in the first lateral disc part 212 and extended in the direction toward the second lateral disc part 213. The accommodation structure 217 is used for accommodating the magnetic conductor 22. When the magnetic conductor 22 is accommodated within the accommodation structure 217, the magnetic conductor 22 is synchronously rotated with the wheel disc 21.

The magnetic conductor 22 includes a connecting plate 223 and plural extension structures 224. The plural extension structures 224 are axially extended from the connecting plate 223. In addition, the plural extension structures 224 are in a radial arrangement with the rotation axis line 211 as the center.

The electro-permanent magnet assembly 23 is located beside the magnetic conductor 22. The magnetic conductor 22 is arranged between the wheel disc 21 and the electro-permanent magnet assembly 23 along an axial direction parallel with the rotation axis line 211. The electro-permanent magnet assembly 23 can be selectively operated in a first operating status or a second operating status. When the electro-permanent magnet assembly 23 is operated in the first operating status, the electro-permanent magnet assembly 23 provides a first magnetic attraction force to at least one extension structure 224 of the plural extension structures 224 in the axial direction. When the electro-permanent magnet assembly 23 is operated in the second operating status, the electro-permanent magnet assembly 23 provides a second magnetic attraction force to at least one extension structure 224 of the plural extension structures 224 in the axial direction. The first magnetic attraction force is greater than the second magnetic attraction force.

Please refer to FIG. 18. In the roller module 2 of the third embodiment, the magnetic conductor 22 is sheathed around the first shaft sleeve 2141. It is noted that numerous modifications and alterations may be made while retaining the teachings of the invention. For example, in a variant example, the magnetic conductor 22 is fixed on a bottom surface 2171 of the accommodation structure 217, but the magnetic conductor 22 is not contacted with the first shaft sleeve 2141.

Figure 19:
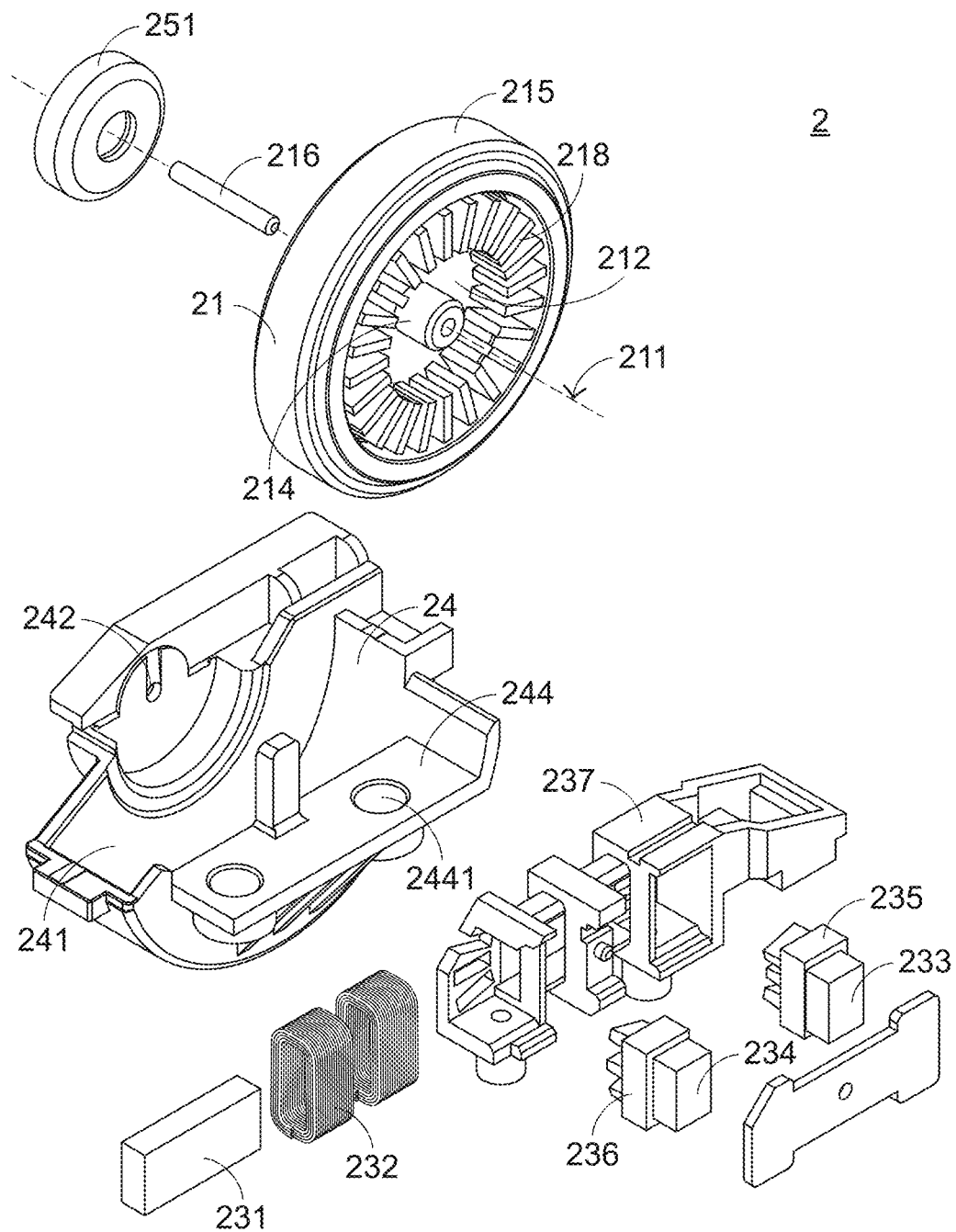
FIG. 19 is a schematic exploded view illustrating a roller module according to a fourth embodiment of the present invention.
Figure 20:
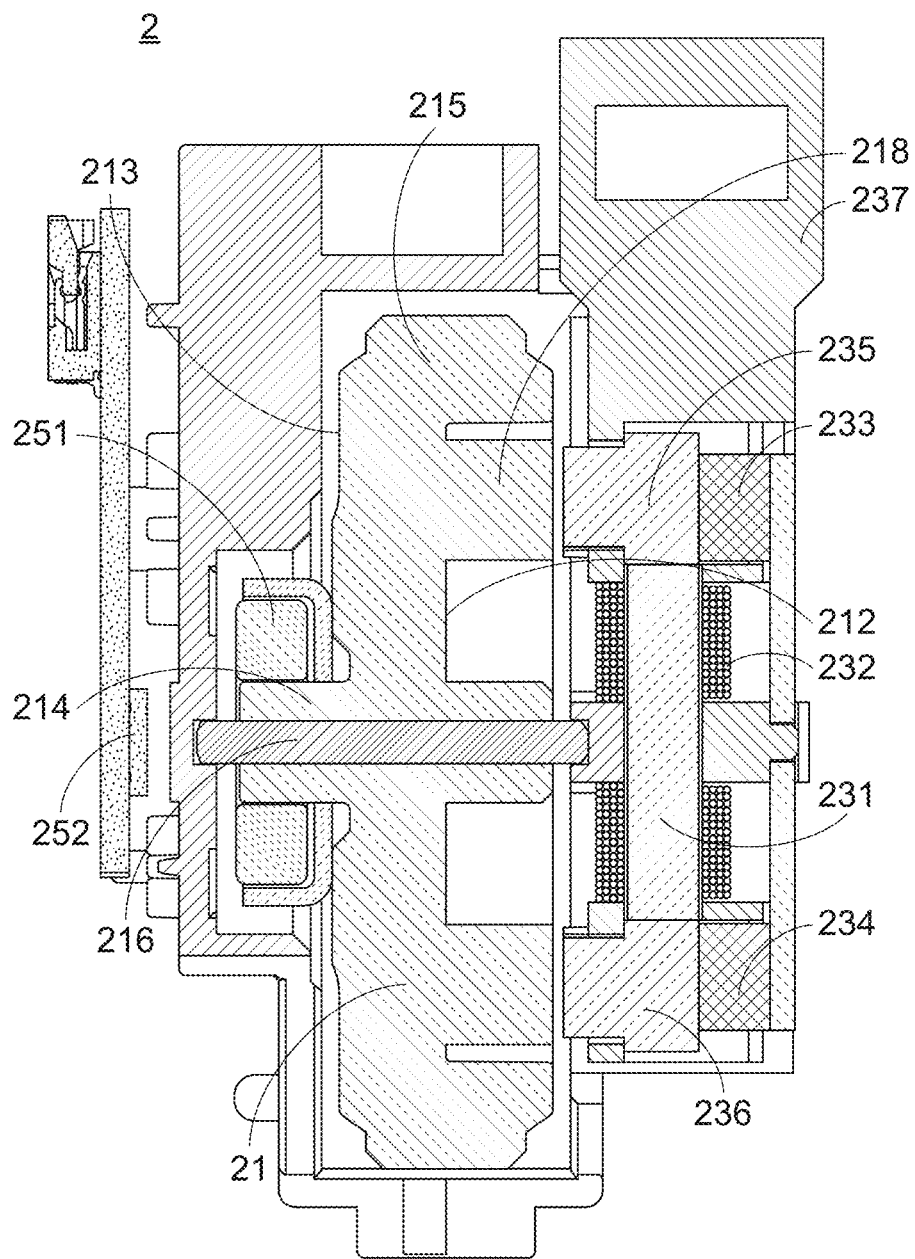
FIG. 20 is a schematic cutaway view illustrating the roller module according to the fourth embodiment of the present invention.

FIG. 19 is a schematic exploded view illustrating a roller module according to a fourth embodiment of the present invention. FIG. 20 is a schematic cutaway view illustrating the roller module according to the fourth embodiment of the present invention. In comparison with the first embodiment, the second embodiment and the third embodiment, the magnetic conductor interacting with the electro-permanent magnet assembly 23 in this embodiment is formed on the wheel disc 21 directly. The other components and the operations of the roller module 2 of the second embodiment are similar to those of the first embodiment or the second embodiment, and not redundantly described herein.

In the first embodiment, the second embodiment and the third embodiment, the wheel disc 21 is magnetically conductive or non-magnetically conductive according to the product requirements or the structure requirements. In the roller module 2 of the fourth embodiment, the wheel disc 21 itself is a magnetic conductor, and thus the wheel disc 21 has magnetic conductivity.

In the roller module 2 of the fourth embodiment, the wheel disc 21 has magnetic conductivity. The wheel disc 21 can be rotated along a rotation axis line 211. The wheel disc 21 includes a first lateral disc part 212, a second lateral disc part 213, a pivotal part 214, an outer disc part 215 and plural extension structures 218. The first lateral disc part 212 and the second lateral disc part 213 are opposed to each other. The outer disc part 215 is arranged around the first lateral disc part 212 and the second lateral disc part 213. As shown in FIG. 20, the plural extension structures 218 are protruded from the first lateral disc part 212 in the axial direction. In some other embodiments, the plural extension structures 218 are inwardly protruded from the outer disc part 215 in the radial direction. In addition, the plural extension structures 218 are in a radial arrangement with the rotation axis line 211 as the center.

The electro-permanent magnet assembly 23 is located beside the wheel disc 21. The electro-permanent magnet assembly 23 can be selectively operated in a first operating status or a second operating status. When the electro-permanent magnet assembly 23 is operated in the first operating status, the electro-permanent magnet assembly 23 provides a first magnetic attraction force to at least one extension structure 218 of the plural extension structures 218 in the axial direction parallel with the rotation axis line 211. When the electro-permanent magnet assembly 23 is operated in the second operating status, the electro-permanent magnet assembly 23 provides a second magnetic attraction force to at least one extension structure 218 of the plural extension structures 218 in the axial direction. The first magnetic attraction force is greater than the second magnetic attraction force.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module, comprising:
   a wheel disc rotatable along a rotation axis line;
   a magnetic conductor coaxially arranged and synchronously rotated with the wheel disc, and comprising a hub and plural spokes, wherein the plural spokes are radially extended from the hub, and the plural spokes are in a radial arrangement; and
   an electro-permanent magnet assembly located beside the magnetic conductor, wherein the magnetic conductor is arranged between the wheel disc and the electro-permanent magnet assembly along an axial direction parallel with the rotation axis line, and the electro-permanent magnet assembly is selectively operated in a first operating status or a second operating status,
   wherein when the electro-permanent magnet assembly is operated in the first operating status, the electro-permanent magnet assembly provides a first magnetic attraction force to at least one spoke of the plural spokes in the axial direction,
   wherein when the electro-permanent magnet assembly is operated in the second operating status, the electro-permanent magnet assembly provides a second magnetic attraction force to at least one spoke of the plural spokes in the axial direction,
   wherein the first magnetic attraction force is greater than the second magnetic attraction force.

2. The roller module according to claim 1, wherein the electro-permanent magnet assembly comprises:
   a first permanent magnet having a first magnetic pole terminal and a second magnetic pole terminal;
   a coil wound around the first permanent magnet;
   a second permanent magnet having a third magnetic pole terminal and a fourth magnetic pole terminal;
   a third permanent magnet having a fifth magnetic pole terminal and a sixth magnetic pole terminal;
   a first magnetic conduction block magnetically coupled with the first magnetic pole terminal and the third magnetic pole terminal; and
   a second magnetic conduction block magnetically coupled with the second magnetic pole terminal and the sixth magnetic pole terminal.

3. The roller module according to claim 2, wherein the first magnetic conduction block comprises a first connecting part and a first protrusion part, wherein the first connecting part is connected with the first magnetic pole terminal and the third magnetic pole terminal, the first protrusion part is axially protruded from the first connecting part and protruded toward the magnetic conductor, and the first protrusion part is located near at least one spoke of the plural spokes.

4. The roller module according to claim 3, wherein the first protrusion part comprises plural first claws, and each of the plural first claws is located near the corresponding spoke of the plural spokes.

5. The roller module according to claim 4, wherein the plural first claws are in the radial arrangement with the rotation axis line as the center.

6. The roller module according to claim 3, wherein the second magnetic conduction block comprises a second connecting part and a second protrusion part, wherein the second connecting part is connected with the second magnetic pole terminal and the sixth magnetic pole terminal, the second protrusion part is axially protruded from the second connecting part and protruded toward the magnetic conductor, and the second protrusion part is located near at least one spoke of the plural spokes.

7. The roller module according to claim 6, wherein the second protrusion part comprises plural second claws, and each of the plural second claws is located near the corresponding spoke of the plural spokes.

8. The roller module according to claim 7, wherein the plural second claws are in the radial arrangement with the rotation axis line as the center.

9. The roller module according to claim 2, wherein the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

10. The roller module according to claim 2, wherein the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

11. The roller module according to claim 2, wherein when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

12. The roller module according to claim 11, wherein when a current flows through the coil, an operating status of the electro-permanent magnet assembly is switched from the first operating status to the second operating status.

13. The roller module according to claim 2, wherein the roller module further comprises a magnetic conduction sheet, and the fourth magnetic pole terminal and the fifth magnetic pole terminal are magnetically coupled with each other through the magnetic conduction sheet.

14. The roller module according to claim 1, wherein the wheel disc comprises a first lateral disc part, a second lateral disc part, a pivotal part and an outer disc part, wherein the first lateral disc part and the second lateral disc part are opposed to each other, and the outer disc part is arranged around the first lateral disc part and the second lateral disc part.

15. The roller module according to claim 14, wherein the roller module further comprises a supporting base, and the supporting base comprises an accommodation recess, a first pivotal hole and a second pivotal hole, wherein a portion of the wheel disc is received within the accommodation recess, and the first pivotal hole and the second pivotal hole are respectively located beside two opposite sides of the accommodation recess.

16. The roller module according to claim 15, wherein the pivotal part of the wheel disc comprises a first shaft sleeve, and the roller module further comprises a shaft rod, wherein the first shaft sleeve is externally extended from the first lateral disc part of the wheel disc, the shaft rod is penetrated through the first shaft sleeve, two ends of the shaft rod are respectively inserted into the first pivotal hole and the second pivotal hole of the supporting base, and the magnetic conductor is sheathed around the first shaft sleeve or the shaft rod.

17. The roller module according to claim 16, wherein the pivotal part of the wheel disc further comprises a second shaft sleeve, the roller module further comprises a rotation sensor, and the rotation sensor comprises a magnetic turntable and a sensing chip, wherein the second shaft sleeve is externally extended from the second lateral disc part of the wheel disc, the shaft rod is further penetrated through the second shaft sleeve, the magnetic turntable is sheathed around the second shaft sleeve, installed in the second shaft sleeve or sheathed around the shaft rod, and the magnetic turntable is synchronously rotated with the wheel disc.

18. The roller module according to claim 15, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, a distal end of the second rotation shaft is inserted into the second pivotal hole, and the magnetic conductor is sheathed around the first rotation shaft.

19. The roller module according to claim 18, wherein the roller module further comprises a rotation sensor, and the rotation sensor comprises a magnetic turntable and a sensing chip, wherein a rotation state of the wheel disc is detected by the sensing chip, and the magnetic turntable is sheathed around the second rotation shaft and synchronously rotated with the wheel disc.

20. A roller module, comprising:
   a wheel disc rotatable along a rotation axis line;
   a magnetic conductor synchronously rotated with the wheel disc, and comprising a connecting plate and plural extension structures, wherein the plural extension structures are axially extended from the connecting plate, and the plural extension structures are in a radial arrangement with the rotation axis line as a center; and
   an electro-permanent magnet assembly located beside the magnetic conductor, wherein the magnetic conductor is arranged between the wheel disc and the electro-permanent magnet assembly along an axial direction parallel with the rotation axis line, and the electro-permanent magnet assembly is selectively operated in a first operating status or a second operating status,
   wherein when the electro-permanent magnet assembly is operated in the first operating status, the electro-permanent magnet assembly provides a first magnetic attraction force to at least one extension structure of the plural extension structures in the axial direction,
   wherein when the electro-permanent magnet assembly is operated in the second operating status, the electro-permanent magnet assembly provides a second magnetic attraction force to at least one extension structure of the plural extension structures in the axial direction,
   wherein the first magnetic attraction force is greater than the second magnetic attraction force.

21. The roller module according to claim 20, wherein the electro-permanent magnet assembly comprises:
   a first permanent magnet having a first magnetic pole terminal and a second magnetic pole terminal;
   a coil wound around the first permanent magnet;
   a second permanent magnet having a third magnetic pole terminal and a fourth magnetic pole terminal;
   a third permanent magnet having a fifth magnetic pole terminal and a sixth magnetic pole terminal;
   a first magnetic conduction block magnetically coupled with the first magnetic pole terminal and the third magnetic pole terminal; and a second magnetic conduction block magnetically coupled with the second magnetic pole terminal and the sixth magnetic pole terminal.

22. The roller module according to claim 21, wherein the first magnetic conduction block comprises a first connecting part and a first protrusion part, wherein the first connecting part is connected with the first magnetic pole terminal and the third magnetic pole terminal, the first protrusion part is axially protruded from the first connecting part and protruded toward the magnetic conductor, and the first protrusion part is located near at least one extension structure of the plural extension structures.

23. The roller module according to claim 22, wherein the first protrusion part comprises plural first claws, and each of the plural first claws is located near the corresponding extension structure of the plural extension structures.

24. The roller module according to claim 23, wherein the plural first claws are in the radial arrangement with the rotation axis line as the center.

25. The roller module according to claim 22, wherein the second magnetic conduction block comprises a second connecting part and a second protrusion part, wherein the second connecting part is connected with the second magnetic pole terminal and the sixth magnetic pole terminal, the second protrusion part is axially protruded from the second connecting part and protruded toward the magnetic conductor, and the second protrusion part is located near at least one extension structure of the plural extension structures.

26. The roller module according to claim 25, wherein the second protrusion part comprises plural second claws, and each of the plural second claws is located near the corresponding spoke of the plural spokes.

27. The roller module according to claim 26, wherein the plural second claws are in the radial arrangement with the rotation axis line as the center.

28. The roller module according to claim 21, wherein the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

29. The roller module according to claim 21, wherein the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

30. The roller module according to claim 21, wherein when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

31. The roller module according to claim 30, wherein when a current flows through the coil, an operating status of the electro-permanent magnet assembly is switched from the first operating status to the second operating status.

32. The roller module according to claim 21, wherein the roller module further comprises a magnetic conduction sheet, and the fourth magnetic pole terminal and the fifth magnetic pole terminal are magnetically coupled with each other through the magnetic conduction sheet.

33. The roller module according to claim 20, wherein the wheel disc comprises a first lateral disc part, a second lateral disc part, a pivotal part, an outer disc part and an accommodation structure, wherein the first lateral disc part and the second lateral disc part are opposed to each other, the outer disc part is arranged around the first lateral disc part and the second lateral disc part, the accommodation structure is concavely formed in the first lateral disc part and extended toward the second lateral disc part, and the magnetic conductor is accommodated within the accommodation structure.

34. The roller module according to claim 33, wherein the roller module further comprises a supporting base, and the supporting base comprises an accommodation recess, a first pivotal hole and a second pivotal hole, wherein a portion of the wheel disc is received within the accommodation recess, and the first pivotal hole and the second pivotal hole are respectively located beside two opposite sides of the accommodation recess.

35. The roller module according to claim 34, wherein the pivotal part of the wheel disc comprises a first shaft sleeve, and the roller module further comprises a shaft rod, wherein the first shaft sleeve is externally extended from the first lateral disc part of the wheel disc, the shaft rod is penetrated through the first shaft sleeve, two ends of the shaft rod are respectively inserted into the first pivotal hole and the second pivotal hole of the supporting base, and the magnetic conductor is sheathed around the first shaft sleeve, sheathed around the shaft rod or fixed in the accommodation structure.

36. The roller module according to claim 35, wherein the pivotal part of the wheel disc further comprises a second shaft sleeve, the roller module further comprises a rotation sensor, and the rotation sensor comprises a magnetic turntable and a sensing chip, wherein the second shaft sleeve is externally extended from the second lateral disc part of the wheel disc, the shaft rod is further penetrated through the second shaft sleeve, the magnetic turntable is sheathed around the second shaft sleeve, installed in the second shaft sleeve or sheathed around the shaft rod, and the magnetic turntable is synchronously rotated with the wheel disc.

37. The roller module according to claim 34, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, a distal end of the second rotation shaft is inserted into the second pivotal hole, and the magnetic conductor is sheathed around the first rotation shaft or fixed in the accommodation structure.

38. The roller module according to claim 37, wherein the roller module further comprises a rotation sensor, and the rotation sensor comprises a magnetic turntable and a sensing chip, wherein a rotation state of the wheel disc is detected by the sensing chip, and the magnetic turntable is sheathed around the second rotation shaft and synchronously rotated with the wheel disc.

39. A roller module, comprising:
a wheel disc having magnetic conductivity, rotatable along a rotation axis line, and comprising a first lateral disc part, a second lateral disc part, a pivotal part, an outer disc part and plural extension structures, wherein the first lateral disc part and the second lateral disc part are opposed to each other, the outer disc part is arranged around the first lateral disc part and the second lateral disc part, the plural extension structures are axially extended from the first lateral disc part or radially extended from the outer disc part, and the plural extension structures are in a radial arrangement with the rotation axis line as a center; and an electro-permanent magnet assembly located beside the magnetic conductor, wherein the electro-permanent magnet assembly is selectively operated in a first operating status or a second operating status, wherein when the electro-permanent magnet assembly is operated in the first operating status, the electro-permanent magnet assembly provides a first magnetic attraction force to at least one extension structure of the plural extension structures in an axial direction parallel with the rotation axis line, wherein when the electro-permanent magnet assembly is operated in the second operating status, the electro-permanent magnet assembly provides a second magnetic attraction force to at least one extension structure of the plural extension structures in the axial direction, wherein the first magnetic attraction force is greater than the second magnetic attraction force.

40. The roller module according to claim 39, wherein the electro-permanent magnet assembly comprises:
a first permanent magnet having a first magnetic pole terminal and a second magnetic pole terminal;
a coil wound around the first permanent magnet;
a second permanent magnet having a third magnetic pole terminal and a fourth magnetic pole terminal;
a third permanent magnet having a fifth magnetic pole terminal and a sixth magnetic pole terminal;
a first magnetic conduction block magnetically coupled with the first magnetic pole terminal and the third magnetic pole terminal; and
a second magnetic conduction block magnetically coupled with the second magnetic pole terminal and the sixth magnetic pole terminal.

41. The roller module according to claim 40, wherein the first magnetic conduction block comprises a first connecting part and a first protrusion part, wherein the first connecting part is connected with the first magnetic pole terminal and the third magnetic pole terminal, the first protrusion part is axially protruded from the first connecting part and protruded toward the wheel disc, and the first protrusion part is located near at least one extension structure of the plural extension structures.

42. The roller module according to claim 41, wherein the first protrusion part comprises plural first claws, and each of the plural first claws is located near the corresponding extension structure of the plural extension structures.

43. The roller module according to claim 42, wherein the plural first claws are in the radial arrangement with the rotation axis line as the center.

44. The roller module according to claim 40, wherein the second magnetic conduction block comprises a second connecting part and a second protrusion part, wherein the second connecting part is connected with the second magnetic pole terminal and the sixth magnetic pole terminal, the second protrusion part is axially protruded from the second connecting part and protruded toward the wheel disc, and the second protrusion part is located near at least one extension structure of the plural extension structures.

45. The roller module according to claim 44, wherein the second protrusion part comprises plural second claws, and each of the plural second claws is located near the corresponding extension structure of the plural extension structures.

46. The roller module according to claim 45, wherein the plural second claws are in the radial arrangement with the rotation axis line as the center.

47. The roller module according to claim 40, wherein the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

48. The roller module according to claim 40, wherein the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

49. The roller module according to claim 40, wherein when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

50. The roller module according to claim 49, wherein when a current flows through the coil, an operating status of the electro-permanent magnet assembly is switched from the first operating status to the second operating status.

51. The roller module according to claim 40, wherein the roller module further comprises a magnetic conduction sheet, and the fourth magnetic pole terminal and the fifth magnetic pole terminal are magnetically coupled with each other through the magnetic conduction sheet.

52. The roller module according to claim 39, wherein the roller module further comprises a supporting base, and the supporting base comprises an accommodation recess, a first pivotal hole and a second pivotal hole, wherein a portion of the wheel disc is received within the accommodation recess, and the first pivotal hole and the second pivotal hole are respectively located beside two opposite sides of the accommodation recess.

53. The roller module according to claim 52, wherein the pivotal part of the wheel disc comprises a first shaft sleeve, and the roller module further comprises a shaft rod, wherein the first shaft sleeve is externally extended from the first lateral disc part of the wheel disc, the shaft rod is penetrated through the first shaft sleeve, and two ends of the shaft rod are respectively inserted into the first pivotal hole and the second pivotal hole of the supporting base.

54. The roller module according to claim 53, wherein the pivotal part of the wheel disc further comprises a second shaft sleeve, the roller module further comprises a rotation sensor, and the rotation sensor comprises a magnetic turntable and a sensing chip, wherein the second shaft sleeve is externally extended from the second lateral disc part of the wheel disc, the shaft rod is further penetrated through the second shaft sleeve, the magnetic turntable is sheathed around the second shaft sleeve, installed in the second shaft sleeve or sheathed around the shaft rod, and the magnetic turntable is synchronously rotated with the wheel disc.

55. The roller module according to claim 52, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, and a distal end of the second rotation shaft is inserted into the second pivotal hole.

56. The roller module according to claim 55, wherein the roller module further comprises a rotation sensor, and the rotation sensor comprises a magnetic turntable and a sensing chip, wherein a rotation state of the wheel disc is detected by the sensing chip, and the magnetic turntable is sheathed around the second rotation shaft and synchronously rotated with the wheel disc.

* * * * *